United States Patent
Nie et al.

(10) Patent No.: US 9,873,182 B2
(45) Date of Patent: Jan. 23, 2018

(54) ABRASIVE WHEELS AND METHODS FOR MAKING AND USING SAME

(71) Applicants: Saint-Gobain Abrasives, Inc., Worcester, MA (US); Saint-Gobain Abrasifs, Conflans-Sainte-Honorine (FR)

(72) Inventors: Dashi Nie, Shanghai (CN); Shenglan Huang, Shanghai (CN); Gaoxiang Gou, Shanghai (CN)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 457 days.

(21) Appl. No.: 14/418,293

(22) PCT Filed: Jul. 29, 2013

(86) PCT No.: PCT/US2013/052496
§ 371 (c)(1),
(2) Date: Jan. 29, 2015

(87) PCT Pub. No.: WO2014/022278
PCT Pub. Date: Feb. 6, 2014

(65) Prior Publication Data
US 2015/0251294 A1  Sep. 10, 2015

Related U.S. Application Data

(60) Provisional application No. 61/724,480, filed on Nov. 9, 2012.

(30) Foreign Application Priority Data

Jul. 31, 2012 (CN) .......................... 2012 1 0269832

(51) Int. Cl.
B24D 3/32 (2006.01)
B24D 3/20 (2006.01)
(Continued)

(52) U.S. Cl.
CPC ................. B24D 3/32 (2013.01); B24D 3/20 (2013.01); C09C 1/407 (2013.01); C09K 3/1409 (2013.01);
(Continued)

(58) Field of Classification Search
CPC ....................................................... B24D 3/32
(Continued)

(56) References Cited

U.S. PATENT DOCUMENTS 5,876,470 A    3/1999  Abrahamson
6,015,338 A    1/2000  Hong et al.
(Continued)

FOREIGN PATENT DOCUMENTS

CN    85102067 A    1/1987
CN    1509842 A    7/2004
(Continued)

OTHER PUBLICATIONS

JB/T3629-1999. Common abrasive Black Fused Alumina. Chinese Standard. Abstract Only. 1 pg.
(Continued)

*Primary Examiner* — Robert Rose
(74) *Attorney, Agent, or Firm* — Abel Law Group, LLP; Thomas Osborn

(57) ABSTRACT

A grinding tool includes a body having a first layer. The first layer can include bond material that is at least about 20 vol % of a total volume of the first layer. Additionally, the first layer can include abrasive particles contained within the bond material. In an embodiment, the abrasive particles include a first type of abrasive particle including black
(Continued)

alumina with at least about 10 vol % of a total volume of the abrasive particles including black alumina. In some instances, the grinding tool can include a second layer that includes black alumina.

20 Claims, 13 Drawing Sheets

(51) Int. Cl.
    *C09C 1/40*      (2006.01)
    *C09K 3/14*      (2006.01)
(52) U.S. Cl.
    CPC ...... *C01P 2002/72* (2013.01); *C01P 2004/03* (2013.01); *C01P 2004/54* (2013.01); *C01P 2004/60* (2013.01); *C01P 2006/10* (2013.01)
(58) Field of Classification Search
    USPC .......... 451/541, 548, 540, 544; 51/293, 307, 51/308, 309
    See application file for complete search history.

(56) References Cited

U.S. PATENT DOCUMENTS

| | | |
|---|---|---|
| 6,451,076 B1 | 9/2002 | Nevoret et al. |
| 6,595,845 B1 | 7/2003 | Mizuno et al. |
| 7,344,573 B2 | 3/2008 | Vecchiarelli et al. |
| 8,252,075 B2 | 8/2012 | Zuyev et al. |
| 8,771,390 B2 | 7/2014 | Upadhyay et al. |
| 9,022,840 B2 | 5/2015 | Dinh-Ngoc et al. |
| 2005/0101225 A1 | 5/2005 | Bright et al. |
| 2005/0127077 A1 | 6/2005 | Bange et al. |
| 2005/0137077 A1* | 6/2005 | Bange .................... B24D 18/00 501/127 |
| 2006/0211342 A1 | 9/2006 | Bonner et al. |
| 2007/0010175 A1 | 1/2007 | Feng et al. |
| 2007/0084133 A1* | 4/2007 | Schwabel ................ B24D 3/16 51/307 |
| 2012/0231711 A1* | 9/2012 | Keipert ................ C09K 3/1409 451/534 |
| 2013/0203328 A1* | 8/2013 | Givot ....................... B24D 5/02 451/548 |

FOREIGN PATENT DOCUMENTS

| | | |
|---|---|---|
| CN | 101723651 A | 6/2010 |
| CN | 201573122 U | 9/2010 |
| CN | 201573123 U | 9/2010 |
| CN | 201573124 U | 9/2010 |
| CN | 201573125 U | 9/2010 |
| CN | 102119071 A | 7/2011 |
| CN | 102245352 A | 11/2011 |
| CN | 102341215 A | 2/2012 |
| CN | 102463530 A | 5/2012 |
| EP | 2264115 A1 | 12/2010 |
| KR | 10-2007-0000734 A | 1/2007 |
| KR | 10-2001-0018496 A | 3/2011 |
| WO | 2011109188 A2 | 9/2011 |
| WO | 2012092610 A1 | 7/2012 |
| WO | 2014022270 A1 | 2/2014 |
| WO | 2014022278 A1 | 2/2014 |

OTHER PUBLICATIONS

GB 9257-1988. Chemical analysis methods of black fused alumina. Chinese Standard. Abstract Only. 1 pg.

* cited by examiner

100

```
┌─────────────────────────────────────────────────────┐
│ Provide a mixture for a first layer of a grinding   │
│ wheel, the first layer including an abrasive        │
│ material and at least approximately 13 wt%          │
│ of a bond material, at least approximately 25 wt%   │
│ of the total weight of the abrasive material        │
│ includes a first type of abrasive particles that    │
│ includes black alumina                              │
│                         102                         │
└─────────────────────────────────────────────────────┘
                           │
                           ▼
┌─────────────────────────────────────────────────────┐
│              Place the mixture into a mold          │
│                         104                         │
└─────────────────────────────────────────────────────┘
                           │
                           ▼
┌─────────────────────────────────────────────────────┐
│              Apply a pressing process to            │
│              the mixture while in the mold          │
│                         106                         │
└─────────────────────────────────────────────────────┘
                           │
                           ▼
┌─────────────────────────────────────────────────────┐
│        Heat the mixture to produce the first layer  │
│                    of the grinding wheel            │
│                         108                         │
└─────────────────────────────────────────────────────┘
```

*FIG. 1*

ABRASIVE WHEELS AND METHODS FOR MAKING AND USING SAME

CROSS-REFERENCE TO RELATED APPLICATIONS

This application is the National Stage of International Application No. PCT/US13/52496, entitled "ABRASIVE WHEELS AND METHODS FOR MAKING AND USING SAME", by Dashi Nie et al., filed Jul. 29, 2013, which claims priority to Chinese Patent Application No. 201210269832.4, entitled "ABRASIVE WHEELS AND METHODS FOR MAKING AND USING SAME", by Dashi Nie et al., filed Jul. 31, 2012 and U.S. Provisional Application No. 61/724,480, entitled "ABRASIVE WHEELS AND METHODS FOR MAKING AND USING SAME", by Dashi Nie et al., filed Nov. 9, 2012, both of which are assigned to the current assignee hereof and incorporated herein by reference in their entireties.

BACKGROUND

Typically, bonded abrasive articles are prepared by blending abrasive particles with a bond and optional additives and shaping the resulting mixture using, for instance, a suitable mold. The mixture can be shaped to form a green body which can be thermally processed, for example, by curing, sintering and so forth, to produce an article in which the abrasive particles are held in a three dimensional bond matrix. In some cases, the green body can be cold processed to form the bonded abrasive article. Among bonded abrasive tools, abrasive wheels often are prepared for grinding, cutting, polishing, and the like. Such wheels can be reinforced using, for example, discs cut out of nylon, carbon, glass or cotton cloth, or may not be reinforced.

SUMMARY

The disclosure generally relates to bonded abrasive articles and in particular to abrasive wheels suitable for use as a grinding wheel and to methods for producing such abrasive wheels.

In one aspect, the disclosure is directed to a grinding tool comprising a body having a first layer that includes a bond material. The bond material comprises at least about 20 vol % of a total volume of the first layer. Additionally, the first layer includes abrasive particles contained within the bond material. The abrasive particles include a first type of abrasive particle including black alumina with at least about 10 vol % of a total volume of the abrasive particles including black alumina. In an embodiment, the body can also include a second layer having black alumina abrasive particles.

The above and other features described herein including various details of construction and combinations of parts, and other advantages, will now be more particularly described with reference to the accompanying drawings and pointed out in the claims. It will be understood that the particular methods and articles embody certain features that are shown by way of illustration and not as limitations and that the principles and features described herein may be employed in various and numerous embodiments.

BRIEF DESCRIPTION OF THE DRAWINGS

In the accompanying drawings, reference characters refer to the same parts throughout the different views. The drawings are not necessarily to scale; emphasis has instead been placed upon illustrating features of the articles described herein.

FIG. 1 includes a flow diagram of a method to make a first layer of a grinding wheel according to one embodiment.

DETAILED DESCRIPTION

Figure 2:
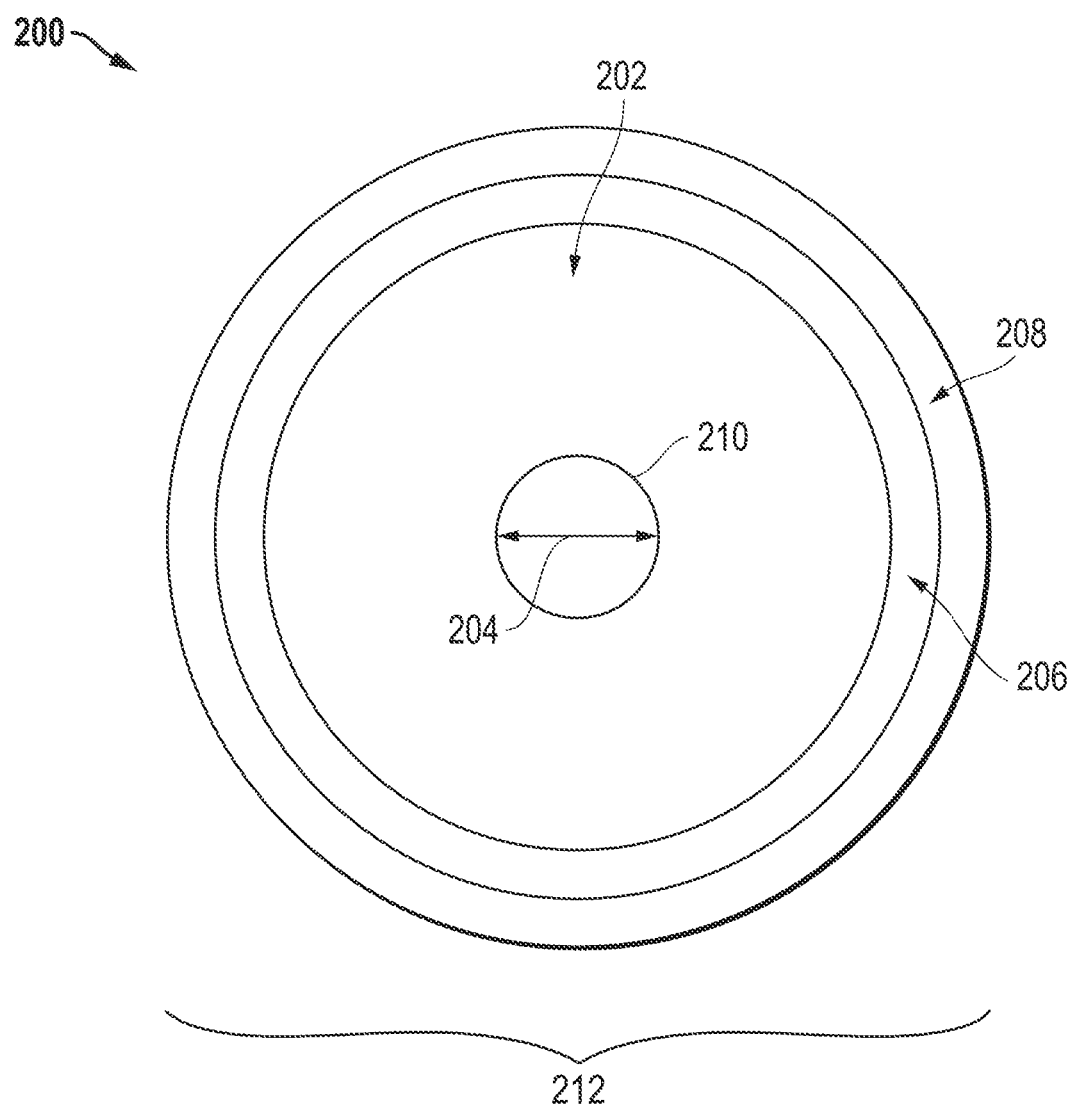
FIG. 2 includes a view of a grinding wheel in accordance with an embodiment.

The disclosure generally relates to bonded abrasive articles, and in particular, to grinding wheels and to methods for producing the same. FIG. 1 includes a flow diagram of a method 100 to make a first layer of a grinding wheel according to one embodiment. In particular, at 102, the method 100 includes providing a mixture including abrasive particles and a bond material. The mixture can also include additional components, such as processing aids, lubricants (e.g. wetting agents), curing agents, crosslinking agents, antistatic agents, a porosity inducer, coloring agents, and the like.

In an embodiment, the mixture may include at least about 64 wt % abrasive particles for a total weight of the mixture, at least about 69 wt % abrasive particles for a total weight of the mixture, at least about 73 wt % abrasive particles for a total weight of the mixture, or at least about 78 wt % abrasive particles for a total weight of the mixture. In another embodiment, the mixture includes no greater than about 87 wt % abrasive particles for a total weight of the mixture, no greater than about 83 wt % abrasive particles for a total weight of the mixture, or no greater than about 79 wt % abrasive particles for a total weight of the mixture. It will be appreciated that the content of abrasive particles in the mixture can be within a range between any of the values noted above. In a particular embodiment, the mixture can include abrasive particles within a range of about 73 wt % to about 83 wt % abrasive particles for a total weight of the mixture.

According to one aspect, the mixture can include one or more than one type of abrasive particle, where different types of abrasive particles can differ from each other based on hardness, toughness, composition, manufacturing process, or a combination thereof. In an embodiment, the abrasive particles of the first layer can include a first type of abrasive particle. In a particular embodiment, at least about 25 wt % of a total weight of the abrasive particles of the first layer includes the first type of abrasive particle. For example, in some instances, at least about 33 wt % of a total weight of the abrasive particles of the first layer includes the first type of abrasive particle, at least about 42 wt % of a total weight of the abrasive particles of the first layer includes the first type of abrasive particle, or at least about 47 wt % of a total weight of the abrasive particles of the first layer includes the first type of abrasive particle. In additional embodiments, no greater than about 64 wt % of a total weight of the abrasive particles of the first layer includes the first type of abrasive particle, no greater than about 59 wt % of a total weight of the abrasive particles of the first layer includes the first type of abrasive particle, or no greater than about 52 wt % of a total weight of the abrasive particles of the first layer includes the first type of abrasive particle. It will be appreciated that the content of the first type of abrasive particle of the first layer can be within a range between any of the values noted above. In a particular illustrative embodiment, the total weight of the abrasive particles can include the first type of abrasive particle within a range of about 42 wt % to about 52 wt %.

In another embodiment, at least about 24 wt % of a total weight of the mixture includes the first type of abrasive particle, at least about 31 wt % of a total weight of the mixture includes the first type of abrasive particle, or at least about 37 wt % of a total weight of the mixture includes the first type of abrasive particle. Additionally, no greater than about 52 wt % of a total weight of the mixture includes the first type of abrasive particle, no greater than about 45 wt % of a total weight of the mixture includes the first type of abrasive particle, or no greater than about 39 wt % of a total weight of the mixture includes the first type of abrasive particle. It will be appreciated that the content of the first type of abrasive particle can be within a range between any of the values noted above.

In some embodiments, the first type of abrasive particle can have a density no greater than about 3.64 g/cm$^3$, no greater than about 3.57 g/cm$^3$, no greater than about 3.52 g/cm$^3$, or no greater than about 3.45 g/cm$^3$.

In certain instances, the first type of abrasive particle can have an average aspect ratio of no greater than about 10:1, no greater than about 5:1, no greater than about 3:1, or no greater than about 1:1.

In a particular embodiment, the first type of abrasive particle can include an oxide, such as alumina, and particularly, black alumina. In one embodiment, the black alumina can include an alpha alumina phase within a range of about 68 vol % to about 92 vol % of a total volume of the black alumina. Additionally, the black alumina can include one or more phases, such as a (Fe, Al, Si)O$_4$ phase within a range of about 12 vol % to about 16 vol % of a total volume of the black alumina. Further, the black alumina can include a FeTiO$_3$ phase within a range of about 4 vol % to about 8 vol % of a total volume of the black alumina. In certain situations, the black alumina can include trace amounts of a SiO$_2$ phase.

In some embodiments, the black alumina can include Al$_2$O$_3$ within a range of about 60 vol % to about 76 vol % of a total volume of the black alumina. In addition, the black alumina can include Fe$_2$O$_3$ within a range of about 7 vol % to about 17 vol % of a total volume of the black alumina, and SiO$_2$ within a range of about 10 vol % to about 20 vol % of a total volume of the black alumina. Furthermore, the black alumina can include TiO$_2$ within a range of about 2 vol % to about 4 vol % of a total volume of the black alumina.

In certain embodiments, the black alumina can have a Vickers Hardness within a range of about 1870 to about 2450. The Vickers Hardness can be measured according to the ASTM E384 standard at the time of filing this patent application.

In an embodiment, the first type of abrasive particle can include a first grade of abrasive particles and a second grade of abrasive particles, where different grades of abrasive particles can differ from each other based on average particle size. In particular instances, the average particle size of the first grade of abrasive particles of the first type of abrasive particle can be within about 10% of the average particle size of the second grade of abrasive particles of the first type of abrasive particle, within about 25% of the average particle size of the second grade of abrasive particles of the first type of abrasive particle, within about 40% of the average particle size of the second grade of abrasive particles of the first type of abrasive particle, within about 55% of the average particle size of the second grade of abrasive particles of the first type of abrasive particle, within about 70% of the average particle size of the second grade of abrasive particles of the first type of abrasive particle, within about 85% of the average particle size of the second grade of abrasive particles of the first type of abrasive particle, or within about 90% of the average particle size of the second grade of abrasive particles of the first type of abrasive particle. The relationship between the average particle size of the first grade of abrasive particles of the first type of abrasive particle and the average particle size of the second grade of abrasive particles of the first type of abrasive particle can be calculated based on the equation $((Gt1-Gt2)/Gt1) \times 100\%$, where $Gt1$ represents the average particle size of the first grade of abrasive particles of the first type of abrasive particle and $Gt2$ represents the average particle size of the second grade of abrasive particles of the first type of abrasive particle.

In some cases, the first grade of abrasive particles of the first type of abrasive particle can have an average particle size of at least about 0.34 mm, at least about 0.45 mm, at least about 0.52 mm, or at least about 0.60 mm. In another embodiment, the first grade of abrasive particles of the first type of abrasive particle can have an average particle size no greater than about 1.16 mm, no greater than about 1.03 mm, no greater than about 0.91 mm, or no greater than about 0.76 mm. It will be appreciated that the average particle size of the first grade of abrasive particles of the first type of abrasive particle can be within a range between any of the values noted above. In a particular illustrative embodiment, the average particle size of the first grade of abrasive particles of the first type of abrasive particle can be within a range of about 0.52 mm to about 0.76 mm.

In an additional embodiment, the second grade of abrasive particles of the first type of abrasive particle can have an average particle size of at least about 0.47 mm, at least about 0.55 mm, at least about 0.63 mm, or at least about 0.71 mm. In other embodiments, the second grade of abrasive particles of the first type of abrasive particle can have an average particle size of no greater than about 1.29 mm, no greater than about 1.14 mm, no greater than about 0.98 mm, or no greater than about 0.86 mm. It will be appreciated that the average particle size of the second grade of abrasive particles of the first type of abrasive particle can be within a range between any of the values noted above. In a particular illustrative embodiment, the average particle size of the second grade of abrasive particles of the first type of abrasive particle can be within a range of about 0.63 mm to about 0.86 mm.

In certain embodiments, the abrasive particles of the first layer can include a second type of abrasive particle. In a particular embodiment, the average particle size of the first type of abrasive particle can be within about 10% of the average particle size of the second type of abrasive particle, the average particle size of the first type of abrasive particle can be within about 25% of the average particle size of the second type of abrasive particle, the average particle size of the first type of abrasive particle can be within about 40% of the average particle size of the second type of abrasive particle, the average particle size of the first type of abrasive particle can be within about 55% of the average particle size of the second type of abrasive particle, the average particle size of the first type of abrasive particle can be within about 70% of the average particle size of the second type of abrasive particle, the average particle size of the first type of abrasive particle can be within about 85% of the average particle size of the second type of abrasive particle, or the average particle size of the first type of abrasive particle can be within about 90% of the average particle size of the second type of abrasive particle. The relationship between the average particle size of the first type of abrasive particle and the average particle size of the second type of abrasive particle can be calculated based on the equation $((Pt1-Pt2)/Pt1) \times 100\%$, where $Pt1$ represents the average particle size of the first type of abrasive particle and $Pt2$ represents the average particle size of the second type of abrasive particle.

In some aspects, at least about 35 wt % of a total weight of the abrasive particles of the first layer includes the second type of abrasive particle, at least about 43 wt % of a total weight of the abrasive particles of the first layer includes the second type of abrasive particle, or at least about 48 wt % of a total weight of the abrasive particles of the first layer includes the second type of abrasive particle. In additional scenarios, no greater than about 65 wt % of a total weight of the abrasive particles of the first layer includes the second type of abrasive particle, no greater than about 59 wt % of a total weight of the abrasive particles of the first layer include the second type of abrasive particle, or no greater than about 53 wt % of a total weight of the abrasive particles of the first layer include the second type of abrasive particle. It will be appreciated that the content of the second type of abrasive particle in the first layer can be within a range between any of the values noted above. In a particular illustrative embodiment, the total weight of the abrasive particles of the first layer can include the second type of abrasive particle within a range of about 48 wt % to about 59 wt %.

In another embodiment, at least about 29 wt % of a total weight of the mixture includes the second type of abrasive particle, at least about 36 wt % of a total weight of the mixture includes the second type of abrasive particle, or at least about 42 wt % of a total weight of the mixture includes the second type of abrasive particle. Additionally, no greater than about 55 wt % of a total weight of the mixture includes the second type of abrasive particle, no greater than about 49 wt % of a total weight of the mixture includes the second type of abrasive particle, or no greater than about 44 wt % of a total weight of the mixture includes the second type of abrasive particle. It will be appreciated that the content of the second type of abrasive particle can be within a range between any of the values noted above.

In some embodiments, the second type of abrasive particle can have a density of at least about 3.74 g/cm$^3$, at least about 3.81 g/cm$^3$, at least about 3.89 g/cm$^3$, or at least about 3.96 g/cm$^3$. In certain instances, the second type of abrasive particle can have an average aspect ratio of no greater than about 2:1, no greater than about 1.5:1, or no greater than about 1:1.

In a further embodiment, the second type of abrasive particle can include a first grade of abrasive particles and a second grade of abrasive particles. In some cases, the first grade of abrasive particles of the second type of abrasive particle can have an average particle size of no greater than about 0.83 mm, no greater than about 0.76 mm, or no greater than about 0.71 mm. Additionally, the first grade of abrasive particles of the second type of abrasive particle can have an average particle size of at least about 0.43 mm, at least about 0.49 mm, at least about 0.55 mm, or at least about 0.67 mm. It will be appreciated that the average particle size of the first grade of abrasive particles of the second type of abrasive particle can be within a range between any of the values noted above. In a particular illustrative embodiment, the average particle size of the first grade of abrasive particles of the second type of abrasive particle can be within a range of about 0.67 mm to about 0.76 mm.

In particular embodiments, the second grade of abrasive particles of the second type of abrasive particle can have an average particle size of no greater than about 0.73 mm, no greater than about 0.66 mm, or no greater than about 0.60 mm. In other embodiments, the second grade of abrasive particles of the second type of abrasive particle can have an average particle size of at least about 0.38 mm, at least about 0.44 mm, at least about 0.50 mm, or at least about 0.57 mm. It will be appreciated that the average particle size of the second grade of abrasive particles of the second type of abrasive particle can be within a range between any of the values noted above. In a particular illustrative embodiment, the average particle size of the second grade of abrasive particles of the second type of abrasive particle can be within a range of about 0.57 mm to about 0.66 mm.

In some instances, the average particle size of the first grade of abrasive particles of the second type of abrasive particle is within about 10% of the average particle size of the second grade of abrasive particles of the second type of abrasive particle, within about 25% of the average particle size of the second grade of abrasive particles of the second type of abrasive particle, within about 40% of the average particle size of the second grade of abrasive particles of the second type of abrasive particle, within about 55% of the average particle size of the second grade of abrasive particles of the second type of abrasive particle, within about 70% of the average particle size of the second grade of abrasive particles of the second type of abrasive particle, within about 85% of the average particle size of the second grade of abrasive particles of the second type of abrasive particle, or within about 90% of the average particle size of the second grade of abrasive particles of the second type of abrasive particle. The relationship between the average particle size of the first grade of abrasive particles of the second type of abrasive particle and the average particle size of the second grade of abrasive particles of the second type of abrasive particle can be calculated based on the equation $((Gt3-Gt4)/Gt3) \times 100\%$, where $Gt3$ represents the average particle size of the first grade of abrasive particles of the second type of abrasive particle and $Gt4$ represents the average particle size of the second grade of abrasive particles of the second type of abrasive particle.

In a particular embodiment, the second type of abrasive particle can include an oxide, such as alumina, zirconia, or a combination thereof. Some exemplary alumina materials can include brown fused alumina, white fused alumina, or a combination thereof. Notably, in one embodiment, the alumina composition of the second type of abrasive particle can be distinct from an alumina composition of the first type of abrasive particle.

In an illustrative embodiment, the abrasive particles of the mixture can consist essentially of black alumina and brown fused alumina. In one embodiment, the brown fused alumina can include $Al_2O_3$ within a range of about 92 wt % to about 98 wt %, $Fe_2O_3$ within a range of about 0.3 wt % to about 0.7 wt %, CaO within a range of about 0.3 wt % to about 0.8 wt %, $TiO_2$ within a range of about 1.1 wt % to about 3.2 wt %, $SiO_2$ within a range of about 0.3 wt % to about 1.7 wt %, MgO within a range of about 0.1 wt % to about 0.4 wt %, or any combination thereof.

In an embodiment, the mixture can include at least about 13 wt % bond material of the first layer for a total weight of the mixture, at least about 17 wt % bond material of the first layer for a total weight of the mixture, or at least about 21 wt % bond material of the first layer for a total weight of the mixture. In other embodiments, the mixture can include no greater than about 33 wt % bond material of the first layer for a total weight of the mixture, no greater than about 28 wt % bond material of the first layer for a total weight of the mixture, no greater than about 24 wt % bond material of the first layer for a total weight of the mixture, or no greater than about 22 wt % bond material of the first layer for a total weight of the mixture. It will be appreciated that the content of bond material can be within a range between any of the values noted above. In a particular illustrative embodiment, the mixture can include an amount of bond material within a range of about 17 wt % to about 24 wt % for a total weight of the mixture.

In certain situations, the bond material of the first layer can include at least about 43 wt % of a resin bond material for a total weight of the bond material for the first layer, at least about 51 wt % of a resin bond material for a total weight of the bond material for the first layer, or at least about 58 wt % of a resin bond material for a total weight of the bond material for the first layer. In other instances, the bond material of the first layer can include no greater than about 77 wt % of a resin bond material for a total weight of the bond material for the first layer, no greater than about 70 wt % of a resin bond material for a total weight of the bond material for the first layer, or no greater than about 63 wt % of a resin bond material for a total weight of the bond material for the first layer. It will be appreciated that the content of resin bond material can be within a range between any of the values noted above. In a particular illustrative embodiment, the content of a resin bond material can be within a range of about 58 wt % to about 70 wt % of a total weight of the bond material for the first layer. In another particular illustrative embodiment, the resin bond material can include an epoxy resin, a polyester resin, a phenolic resin, a cyanate ester resin, a polyurethane resin, shellacs, or a combination thereof.

In another embodiment, the mixture can include at least about 4 wt % resin bond material for a total weight of the mixture, at least about 9 wt % resin bond material for a total weight of the mixture, or at least about 14 wt % resin bond material for a total weight of the mixture. Additionally, the mixture can include no greater than about 26 wt % resin bond material for a total weight of the mixture, no greater than about 21 wt % resin bond material for a total weight of the mixture, or no greater than about 17 wt % resin bond material for a total weight of the mixture. It will be appreciated that the content of the resin bond material can be within a range between any of the values noted above.

Furthermore, the resin bond material can be provided to the mixture as a liquid, a solid, or both. In an embodiment, the mixture can include a liquid phenolic resin, such as a resole resin, and a powdered phenolic resin, such as a novolac resin. In one illustrative embodiment, the powdered resin can include hexamine within a range of about 6 wt % to about 14 wt % for a total weight of the powdered resin. In certain embodiments, a ratio of powdered resin to liquid resin by weight can be at least about 1:1, at least about 1.5:1, at least about 2:1, or at least about 3:1. In other embodiments, a ratio of powder resin to liquid resin by weight can be no greater than about 6:1, no greater than about 5:1, or no greater than about 4:1.

The bond material of the first layer can also include one of more filler materials. In certain aspects, the bond material of the first layer can include at least about 24 wt % filler material for a total weight of the bond material for the first layer, at least about 32 wt % filler material for a total weight of the bond material for the first layer, or at least about 37 wt % filler material for a total weight of the bond material for the first layer. In other aspects, the bond material of the first layer can include no greater than about 53 wt % filler material for a total weight of the bond material for the first layer, no greater than about 46 wt % filler material for a total weight of the bond material for the first layer, or no greater than about 42 wt % filler material for a total weight of the bond material for the first layer. It will be appreciated that the content of filler material for the first layer can be within a range between any of the values noted above. In a particular illustrative embodiment, the content of filler material for the first layer can be within a range of about 32 wt % filler material to about 42 wt % filler material for a total weight of the bond material for the first layer.

In an additional embodiment, the mixture can include at least about 2 wt % filler material for a total weight of the mixture, at least about 5 wt % filler material for a total weight of the mixture, or at least about 8 wt % filler material for a total weight of the mixture. Additionally, the mixture can include no greater than about 17 wt % filler material for a total weight of the mixture, no greater than about 14 wt % filler material for a total weight of the mixture, or no greater than about 11 wt % filler material for a total weight of the mixture. It will be appreciated that the content of the filler material can be within a range between any of the values noted above.

The filler material can have a material selected from the group consisting of powders, granules, spheres, fibers, and a combination thereof. In one embodiment, the filler material can include a material selected from the group consisting of an inorganic material, an organic material, and a combination thereof. In a further embodiment, the filler material can include a material selected from the group consisting of sand, bubble alumina, bauxite, chromites, magnesite, dolomites, bubble mullite, borides, titanium dioxide, carbon products (e.g., carbon black, coke or graphite), wood flour, clay, talc, hexagonal boron nitride, molybdenum disulfide, feldspar, nepheline syenite, glass spheres, glass fibers, $CaF_2$, $KBF_4$, Cryolite ($Na_3AlF_6$), a potassium aluminum fluoride, such as potassium Cryolite ($K_3AlF_6$), pyrites, ZnS, copper sulfide, a material including $Fe_2S$, such as Pyrox, mineral oil, fluorides, carbonates, calcium carbonate, and a combination thereof. In a particular illustrative embodiment, the filler material can consist essentially of a potassium aluminum fluoride material.

In one embodiment, a total density of the bond material of the first layer is at least about 1.36 $g/cm^3$, at least about 1.44 $g/cm^3$, at least about 1.55 $g/cm^3$, or at least about 1.62 $g/cm^3$. In another embodiment, a total density of the bond material of the first layer is no greater than about 1.83 $g/cm^3$, no greater than about 1.76 $g/cm^3$, or no greater than about 1.69 $g/cm^3$. It will be appreciated that the total density of the bond material can be within a range between any of the values noted above. In a particular illustrative embodiment, the total density of the bond material can be within a range of about 1.55 $g/cm^3$ to about 1.69 $g/cm^3$.

At 104, the method 100 includes placing the mixture into a mold. The mold can be made of stainless-steel, high carbon-steel, high chrome-steel, another suitable material, or a combination thereof. In some situations, one or more layers of the mixture can be placed into the mold to form layers of the grinding wheel, such as by linear or rotational spreading. In an illustrative embodiment, other components, such as one or more reinforcement layers, one or more support layers, or both, can be placed above, below, or both above and below, at least one of the layers of the mixture. In certain embodiments, a reinforcement layer can comprise a material selected from the group consisting of an organic material, an inorganic material, and a combination thereof. Additionally, the reinforcement layer can comprise a material selected from the group consisting of a fabric, a fiber, a film, a woven material, a non-woven material, a glass, a fiberglass, a ceramic, a polymer, a resin, a polymer, a fluorinated polymer, an epoxy resin, a polyester resin, a polyurethane, a polyester, a rubber, a polyimide, a polybenzimidazole, an aromatic polyamide, a modified phenolic resin, and a combination thereof.

At 106, the method 100 includes applying a pressing process to the mixture while in the mold. In situations when multiple abrasive layers are formed, each of the abrasive layers can be subjected to a respective pressing process. The pressing process can include a cold pressing process, a warm pressing process, or a hot pressing process. In an illustrative embodiment, a warm pressing process can be applied at a temperature within a range of about 35° C. to about 75° C.

At 108, the method 100 includes heating the mixture to produce a cutting wheel. In some embodiments, the heating of the mixture to produce the cutting wheel may be optional.

In an embodiment, the grinding wheel can also have a second layer that includes bond material and abrasive particles. In certain cases, the second layer can be a support layer for a grinding wheel. In some scenarios, the bond material of the second layer can have a composition that is substantially the same as the bond material of the first layer, while in other situations, the bond material of the second layer can have a composition that is different from the bond material of the first layer. The second layer can also include additional components, such as filler materials, processing aids, lubricants, curing agents, crosslinking agents, antistatic agents, a porosity inducer, coloring agents, and the like.

In one embodiment, a mixture used to form the second layer can include at least 67 wt % abrasive particles for a total weight of the mixture, at least about 72 wt % abrasive particles for a total weight of the mixture, or at least about 79 wt % abrasive particles for a total weight of the mixture. In other embodiments, the mixture used to form the second layer can include no greater than about 91 wt % abrasive particles for a total weight of the mixture, no greater than about 86 wt % abrasive particles for a total weight of the mixture, or no greater than about 82 wt % abrasive particles for a total weight of the mixture. It will be appreciated that the content of the abrasive particles in the mixture used to form the second layer can be within a range between any of the values noted above.

In particular aspects, the abrasive particles of the first layer can include the first type of abrasive particle, the second type of abrasive particle, or both. In an additional embodiment, the abrasive particles of the second layer can have a composition that is different from that of the abrasive particles of the first layer. For example, the abrasive particles of the second layer can include a content of the first type of abrasive particle that is greater than a content of the second type of abrasive particle. To illustrate, at least about 65 wt % of a total weight of the abrasive particles of the second layer includes the first type of abrasive particle, at least about 77 wt % of a total weight of the abrasive particles of the second layer includes the first type of abrasive particle, at least about 88 wt % of a total weight of the abrasive particles of the second layer include the first type of abrasive particle, or at least about 97 wt % of a total weight of the abrasive particles of the second layer include the first type of the abrasive particle. In one embodiment, the abrasive particles of the second layer consist essentially of the first type of abrasive particle.

In other embodiments, the mixture used to form the second layer can include at least about 12 wt % bond material for a total weight of the mixture, at least about 17 wt % bond material for a total weight of the mixture, or at least about 21 wt % bond material for a total weight of the mixture. In an additional embodiment, the mixture used to form the second layer can include no greater than about 34 wt % bond material for a total weight of the mixture, no greater than about 29 wt % bond material for a total weight of the mixture, or no greater than about 24 wt % bond material for a total weight of the mixture. It will be appreciated that the content of bond material in the mixture used to form the second layer can be within a range between any of the values noted above.

In a particular embodiment, a mixture used to form the second layer can include at least about 4 wt % resin bond material for a total weight of the mixture, at least about 8 wt % resin bond material for a total weight of the mixture, or at least about 11 wt % resin bond material for a total weight of the mixture. In other scenarios, the mixture used to form the second layer can include no greater than about 22 wt % resin bond material, no greater than about 18 wt % resin bond material, or no greater than about 13 wt % resin bond material. It will be appreciated that the content of resin bond material in the mixture used to form the second layer can be within a range between any of the values noted above.

In another embodiment, a mixture used to form the second layer can include at least about 2 wt % filler material for a total weight of the mixture, at least about 7 wt % filler material for a total weight of the mixture, or at least about 10 wt % filler material for a total weight of the mixture. In other scenarios, the mixture used to form the second layer can include no greater than about 21 wt % filler material, no greater than about 16 wt % filler material, or no greater than about 12 wt % filler material. It will be appreciated that the content of filler material in the mixture used to form the second layer can be within a range between any of the values noted above.

In certain embodiments, a mixture used to form the second layer can include a pyrite material within a range of about 1 wt % to about 7 wt % for a total weight of the mixture. In further embodiments, the mixture used to form the second layer can include a cryolite material within a range of about 0.5 wt % to about 5 wt % for a total weight of the mixture. In some instances, the mixture used to form the second layer can include $CaCO_3$ within a range of about 0.5 wt % to about 5 wt % for a total weight of the mixture.

In some situations, the second layer can be formed contemporaneously in the mold with the first layer. In other situations, the second layer can be formed separately from the first layer and subsequently bonded to the first layer.

FIG. 2 includes a view of a grinding wheel 200 in accordance with an embodiment. The cutting wheel 200 includes a body 202 and a mounting hole 204 for mounting the cutting wheel 200 to a cutting tool. The body 202 includes a first layer 206 and a second layer 208. In some embodiments, the first layer 208 can have a composition similar to the compositions of the first layer described with respect to FIG. 1. Additionally, in certain instances, the second layer 210 can have a composition similar to the compositions of the second layer described with respect to FIG. 1.

Although in the illustrative embodiment of FIG. 2 the first layer 206 and the second layer 208 are arranged radially, in other embodiments, the first layer 206 and the second layer 208 can be configured in an axial arrangement, such that the first layer 206 is used as a grinding layer and the second layer 208 is used as a support layer for the grinding layer. In these situations, the first layer 206 and the second layer 208 can have substantially the same diameter. In particular embodiments, the second layer 208 can also serve as a grinding layer.

In the illustrative embodiment of FIG. 2, the mounting hole 204 has a diameter 210 that can be an inner diameter of the body 202. Further, the body 202 can have an outer diameter 212. In some instances, the first layer 206 can have a respective diameter and the second layer 208 can have a respective diameter. In an embodiment, the outer diameter 212 can be at least about 30 cm, at least about 40 cm, at least about 50 cm, at least about 60 cm, or at least about 70 cm. In another embodiment, the outer diameter 208 can be no greater than about 110 cm, no greater than about 100 cm, or no greater than about 90 cm. It will be appreciated that the outer diameter 212 of the body 202 can be within a range between any of the values noted above. In one particular illustrative embodiment, the outer diameter 212 can be within a range of about 30 cm to about 100 cm. In another illustrative embodiment, the outer diameter 212 can be within a range of about 40 cm to about 80 cm.

In certain aspects, the inner diameter 210 can be at least about 1 cm, at least about 9 cm, or at least about 18 cm. In other instances, the inner diameter 210 can be no greater than about 40 cm, no greater than about 33 cm, no greater than about 26 cm, or no greater than about 21 cm. It will be appreciated that the inner diameter 210 of the body 202 can be within a range between any of the values noted above.

The body 202 can also have an axial thickness of at least about 1 cm, at least about 8 cm, or at least about 13 cm. In some cases, the body 202 can have an axial thickness of no greater than about 35 cm, no greater than about 28 cm, no greater than about 22 cm, or no greater than about 17 cm. It will be appreciated that the thickness of the body 202 can be within a range between any of the values noted above. Further more, the body 202 can have a ratio of outer diameter 212 to thickness within a range between about 50:1 to about 4:1.

The body 202 can include materials included in the mixture used to form the first layer of the grinding wheel 200, materials included in the mixture used to form the second layer of the grinding wheel 200, or both, as described previously with respect to FIG. 1. For example, the first layer 206 can include the abrasive particles provided in the mixture for the first layer described with respect to FIG. 1, the bond material provided in the mixture for the first layer described with respect to FIG. 1, and any other components provided in the mixture for the first layer described with respect to FIG. 1. Additionally, the second layer 208 can include the abrasive particles provided in the mixture for the second layer described with respect to FIG. 1, the bond material provided in the mixture for the second layer described with respect to FIG. 1, and any other components provided in the mixture for the second layer described with respect to FIG. 1.

In certain situations, the body 202 can also include one or more axial layers. In an embodiment, the first layer 206 can include one or more axial layers of abrasive particles contained within a bond material. In an additional embodiment, the second layer 208 can include one or more axial layers of abrasive particles contained within a bond material. In some cases, one or more reinforcement layers can be positioned adjacent to the one or more axial layers. In certain constructions, one or more of the reinforcement layers can be overlying or underlying material for an axial layer. In at least one embodiment, a reinforcement layer can be in direct contact with an axial layer. In a particular embodiment, a reinforcement layer can be bonded directly to and at least partially impregnating portions of an axial layer. In other designs of embodiments herein, at least one axial layer (or a plurality of axial layers) can be disposed between a first reinforcement layer and a second reinforcement layer. According to one construction, a plurality of axial layers can be employed as discrete intervening layers separating at least first and second reinforcement layers. It will be appreciated that any combination of reinforcement layers and axial layers are contemplated herein.

In a particular embodiment, the first layer 206 can include a first type of abrasive particle. In an illustrative embodiment, the first type of abrasive particle can include black alumina. Further, the first type of abrasive particle can have an average particle size as described previously with respect to FIG. 1 regarding the average particle size of the first type of abrasive particle of the mixture used to form the first layer. In some cases, the first type of abrasive particle can have a first grade of abrasive particles with a particular average particle size and a second grade of abrasive particles with an average particle size that is different from the particular average particle size of the first grade of abrasive particles. The first grade of abrasive particles and the second grade of abrasive particles of the first type of abrasive particle can have respective average particle sizes as described previously with respect to FIG. 1 regarding the average particle size of the first grade of abrasive particles and the second grade of abrasive particles of the mixture used to form the first layer.

The first layer 206 can also include a second type of abrasive particle, such as brown fused alumina. In an embodiment, the second type of abrasive particle can have an average particle size as described previously with respect to FIG. 1 regarding the average particle size of the second type of abrasive particle of the mixture. Furthermore, the second type of abrasive particle can have a first grade of abrasive particles with a specified average particle size and a second grade of abrasive particles with an average particle size that is different from the specified average particle size of the first grade of abrasive particles. The first grade of abrasive particles and the second grade of abrasive particles of the second type of abrasive particle can have respective average particle sizes as described previously with respect to FIG. 1 regarding the average particle size of the first grade of abrasive particles and the second grade of abrasive particles of the mixture used to form the first layer.

In certain instances, at least about 24 vol % of a total volume of the first layer 206 and the second layer 208 includes abrasive particles, at least about 31 vol % of a total volume of the first layer 206 and the second layer 208 includes abrasive particles, at least about 38 vol % of a total volume of the first layer 206 and the second layer 208 includes abrasive particles, or at least about 46 vol % of a total volume of the first layer 206 and the second layer 208 includes abrasive particles. In other cases, no greater than about 72 vol % of a total volume of the first layer 206 and the second layer 208 includes abrasive particles, no greater than about 65 vol % of a total volume of the first layer 206 and the second layer 208 includes abrasive particles, no greater than about 58 vol % of a total volume of the first layer 206 and the second layer 208 includes abrasive particles, or no greater than about 51 vol % of a total volume of the first layer 206 and the second layer 208 includes abrasive particles. The second layer 208 can also include the first type of abrasive particle included in the first layer 206, the second type of abrasive particle included in the first layer 206, or both.

In an embodiment, the first layer 206 can include at least about 32 vol % abrasive particles for a total volume of the first layer 206, at least about 39 vol % abrasive particles for a total volume of the first layer 206, or at least about 48 vol % abrasive particles for a total volume of the first layer 206. In another embodiment, the first layer 206 can include no greater than about 65 vol % abrasive particles for a total volume of the first layer 206, no greater than about 57 vol % abrasive particles for a total volume of the first layer 206, or no greater than about 51 vol % abrasive particles for a total volume of the first layer 206. It will be appreciated that the content of abrasive particles of the first layer 206 can be within a range between any of the values noted above. In a particular illustrative embodiment, the first layer 206 can include abrasive particles within a range of about 39 vol % to about 51 vol % for a total volume of the first layer 206.

In a particular embodiment, the first layer 206 can include at least about 10 vol % of the first type of abrasive particle for a total volume of the abrasive particles of the first layer 206. For example, the first layer 206 can include at least about 33 vol % of the first type of abrasive particle for a total volume of the abrasive particles of the first layer 206, at least about 38 vol % of the first type of abrasive particle for a total volume of the abrasive particles of the first layer 206, at least about 43 vol % of the first type of abrasive particle for a total volume of the abrasive particles of the first layer 206, or at least about 50 vol % of the first type of abrasive particle for a total volume of the abrasive particles of the first layer 206. Additionally, in an embodiment, the first layer 206 can include no greater than about 99 vol % of the first type of abrasive particle for a total volume of the abrasive particles of the first layer 206, no greater than about 87 vol % of the first type of abrasive particles for a total volume of the abrasive particles of the first layer 206, no greater than about 74 vol % of the first type of abrasive particle for a total volume of the abrasive particles of the first layer 206, no greater than about 68 vol % of the first type of abrasive particle for a total volume of the abrasive particles of the first layer 206, no greater than about 61 vol % of the first type of abrasive particle for a total volume of the abrasive particles of the first layer 206, or no greater than about 55 vol % of the first type of abrasive particles for a total volume of the abrasive particles of the first layer 206. It will be appreciated that the content of the first type of abrasive particle of the first layer 206 can be within a range between any of the values noted above. In a particular illustrative embodiment, the first layer can include the first type of abrasive particle within a range of about 43 vol % to about 55 vol % for a total volume of abrasive particles of the first layer 206. In another illustrative embodiment, the first layer 206 can include the first type of abrasive particle within a range of about 15 vol % to about 30 vol % for a total volume of the first layer 206.

In another embodiment, the first layer 206 can include at least about 3 vol % of the second type of abrasive particle for a total volume of the abrasive particles of the first layer 206, at least about 15 vol % of the second type of abrasive particle for a total volume of the abrasive particles of the first layer 206, at least about 29 vol % of the second type of abrasive particle for a total volume of the abrasive particles of the first layer 206, at least about 43 vol % of the second type of abrasive particle for a total volume of the abrasive particles of the first layer 206, or at least about 50 vol % of the second type of abrasive particle for a total volume of the abrasive particles of the first layer 206. Additionally, the first layer 206 can include no greater than about 80 vol % of the second type of abrasive particle for a total volume of the abrasive particles of the first layer 206, no greater than about 72 vol % of the second type of abrasive particle for a total volume of the abrasive particles of the first layer 206, no greater than about 63 vol % of the second type of abrasive particle for a total volume of the abrasive particles of the first layer 206, or no greater than about 55 vol % of the second type of abrasive particle for a total volume of the abrasive particles of the first layer 206. It will be appreciated that the content of the second type of abrasive particle of the first layer 206 can be within a range between any of the values noted above. In a particular illustrative embodiment, the first layer 206 can include the second type of abrasive particle within a range of about 43 vol % to about 55 vol % for a total volume of abrasive particles of the first layer 206. In another illustrative embodiment, the first layer 206 can include the second type of abrasive particle within a range of about 15 vol % to about 30 vol % for a total volume of the first layer 206.

In certain aspects, a content of the first type of abrasive particle of the first layer 206 can be within about 3% of a content of the second type of abrasive particle of the first layer 206, a content of the first type of abrasive particle of the first layer 206 can be within about 5% of a content of the second type of abrasive particle of the first layer 206, a content of the first type of abrasive particle of the first layer 206 can be within about 7% of a content of the second type of abrasive particle of the second layer 206, or a content of the first type of abrasive particle of the first layer 206 can be within about 10% of a content of the second type of abrasive particle of the first layer 206. In a particular illustrative embodiment, a content of the first type of abrasive particle of the first layer 206 is essentially the same as the content of the second type of abrasive particle of the first layer 206.

In other embodiments, the first layer 206 can include at least about 20 vol % bond material for a total volume of the first layer 206, at least about 22 vol % bond material for a total volume of the first layer 206, at least about 25 vol % bond material for a total volume of the first layer 206, at least about 28 vol % bond material for a total volume of the first layer 206, or at least about 30 vol % bond material for a total volume of the first layer 206. Additionally, the first layer 206 can include no greater than about 45 vol % bond material for a total volume of the first layer 206, no greater than about 39 vol % bond material for a total volume of the first layer 206, or no greater than about 33 vol % bond material for a total volume of the first layer 206. It will be appreciated that the content of the bond material of the first layer 206 can be within a range between any of the values noted above. In a particular illustrative embodiment, the content of the bond material of the first layer 206 can be within a range of about 25 vol % to about 33 vol % for a total volume of the first layer 206.

In some situations, the first layer 206 can include at least about 55 vol % of a resin bond material for a total volume of the bond material of the first layer 206, at least about 63 vol % of a resin bond material for a total volume of the bond material of the first layer 206, at least about 71 vol % of a resin bond material for a total volume of the bond material of the first layer 206, or at least about 76 vol % of the bond material for a total volume of the bond material of the first layer 206. In other aspects, the first layer 206 can include no greater than about 95 vol % of a resin bond material for a total volume of the bond material of the first layer 206, no greater than about 90 vol % of a resin bond material for a total volume of the bond material of the first layer 206, no greater than about 85 vol % of a resin bond material for a total volume of the bond material of the first layer 206, or no greater than about 80 vol % of a resin bond material for a total volume of the bond material of the first layer 206. It will be appreciated that the content of the resin bond material of the first layer 206 can be within a range between any of the values noted above. In a particular illustrative embodiment, the content of the resin bond material of the first layer 206 can be within a range of about 76 vol % to about 85 vol % for a total volume of the bond material of the first layer 206. In another illustrative embodiment, the first layer 206 can include the resin bond material within a range of about 20 vol % to about 30 vol % for a total volume of the first layer 206.

In an embodiment, the first layer 206 can include at least about 4 vol % of one or more filler materials for a total volume of the bond material of the first layer 206, at least about 11 vol % of one or more filler materials for a total volume of the bond material of the first layer 206, at least about 16 vol % of one or more filler materials for a total volume of the bond material of the first layer 206, or at least about 20 vol % of one or more filler materials for a total volume of the bond material of the first layer 206. Further, the first layer 206 can include no greater than about 40 vol % of one or more filler materials for a total volume of the bond material of the first layer 206, no greater than about 35 vol % of one or more filler materials for a total volume of the bond material of the first layer 206, no greater than about 30 vol % of one or more filler materials for a total volume of the bond material of the first layer 206, or no greater than about 25 vol % of one or more filler materials for a total volume of the first layer 206. It will be appreciated that the content of the filler material of the first layer 206 can be within a range between any of the values noted above. In a particular illustrative embodiment, the content of the filler material of the first layer 206 can be within a range of about 16 vol % to about 25 vol % for a total volume of the bond material of the first layer 206. In another illustrative embodiment, the first layer 206 can include the one or more filler materials within a range of about 4 vol % to about 8 vol % for a total volume of the first layer 206.

In particular embodiments, the first layer 206 can include an amount of porosity, such as at least about 10 vol % porosity for a total volume of the first layer 206, at least about 16 vol % porosity for a total volume of the first layer 206, or at least about 22 vol % porosity for a total volume of the first layer 206. In additional cases, the first layer 206 can include no greater than about 35 vol % porosity for a total volume of the first layer 206, no greater than about 30 vol % porosity for a total volume of the first layer 206, or no greater than about 25 vol % porosity for a total volume of the first layer 206. It will be appreciated that the porosity of the first layer 206 can be within a range between any of the values noted above. In a particular illustrative embodiment, the porosity of the first layer 206 can be within a range of about 16 vol % to about 25 vol % for a total volume of the first layer 206.

In an embodiment, the second layer 208 can include at least about 41 vol % abrasive particles for a total volume of the second layer 208, at least about 46 vol % abrasive particles for a total volume of the second layer 208, or at least about 52 vol % abrasive particles for a total volume of the second layer 208. In some instances, the second layer 208 can include no greater than about 64 vol % abrasive particles for a total volume of the second layer 208, no greater than about 59 vol % abrasive particles for a total volume of the second layer 208, or no greater than about 54 vol % abrasive particles for a total volume of the second layer 208. It will be appreciated that the content of abrasive particles of the second layer 208 can be within a range between any of the values noted above. In an illustrative embodiment, the second layer 208 can include abrasive particles within a range of about 46 vol % to about 54 vol % for a total volume of the second layer 208.

In other embodiments, the second layer 208 can include at least about 50 vol % of the first type of abrasive particle for a total volume of abrasive particles of the second layer 208, at least about 75 vol % of the first type of abrasive particle for a total volume of abrasive particles for the second layer 208, or at least about 90 vol % of the first type of abrasive particle for a total volume of abrasive particles for the second layer 208. In a particular illustrative embodiment, essentially all of the abrasive particles of the second layer 208 can include the first type of abrasive particle.

In an embodiment, the second layer 208 can include at least about 19 vol % bond material for a total volume of the second layer 208, at least about 22 vol % bond material for a total volume of the second layer 208, or at least about 26 vol % bond material for a total volume of the second layer 208. Additionally, the second layer 208 can include no greater than about 39 vol % bond material for a total volume of the second layer 208, no greater than about 33 vol % bond material for a total volume of the second layer 208, or no greater than about 29 vol % bond material for a total volume of the second layer 208. It will be appreciated that the content of the bond material of the second layer 208 can be within a range between any of the values noted above. In a particular illustrative embodiment, the content of the bond material of the second layer 208 can be within a range of about 22 vol % to about 33 vol % for a total volume of the second layer 208.

In some situations, the second layer 208 can include at least about 58 vol % of a resin bond material for a total volume of the bond material of the second layer 208, at least about 65 vol % of a resin bond material for a total volume of the bond material of the second layer 208, or at least about 75 vol % of a resin bond material for a total volume of the bond material of the second layer 208. In other aspects, the second layer 208 can include no greater than about 88 vol % of a resin bond material for a total volume of the bond material of the second layer 208, no greater than about 83 vol % of a resin bond material for a total volume of the bond material of the second layer 208, or no greater than about 79 vol % of a resin bond material for a total volume of the bond material of the second layer 208. It will be appreciated that the content of the resin bond material of the second layer 208 can be within a range between any of the values noted above. In a particular illustrative embodiment, the content of the resin bond material of the second layer 208 can be within a range of about 65 vol % to about 83 vol % for a total volume of the bond material of the second layer 208. In another illustrative embodiment, the second layer 208 can include the resin bond material within a range of about 14 vol % to about 27 vol % for a total volume of the second layer 208.

In an embodiment, the second layer 208 can include at least about 7 vol % of one or more filler materials for a total volume of the bond material of the second layer 208, at least about 13 vol % of one or more filler materials for a total volume of the bond material of the second layer 208, at least about 19 vol % of one or more filler materials for a total volume of the bond material of the second layer 208, or at least about 25 vol % of one or more filler materials for a total volume of the bond material of the second layer 208. Further, the second layer 208 can include no greater than about 36 vol % of one or more filler materials for a total volume of the bond material of the second layer 208, no greater than about 31 vol % of one or more filler materials for a total volume of the bond material of the second layer 208, or no greater than about 28 vol % of one or more filler materials for a total volume of the bond material of the second layer 208. It will be appreciated that the content of the filler material of the second layer 208 can be within a range between any of the values noted above. In a particular illustrative embodiment, the content of the filler material of the second layer 208 can be within a range of about 19 vol % to about 31 vol % for a total volume of the bond material of the second layer 208. In another illustrative embodiment, the second layer 208 can include the one or more filler materials within a range of about 4 vol % to about 10 vol % for a total volume of the second layer 208.

In one aspect, the one or more filler materials of the second layer 208 can include at least about 3 vol % pyrite material for a total volume of bond material of the second layer 208, at least about 6 vol % pyrite material for a total volume of bond material of the second layer 208, or at least about 9 vol % pyrite material for a total volume of bond material of the second layer 208. In additional embodiments, the one or more filler materials of the second layer 208 can include no greater than about 17 vol % pyrite material for a total volume of bond material of the second layer 208, no greater than about 14 vol % pyrite material for a total volume of bond material of the second layer 208, or no greater than about 11 vol % pyrite material for a total volume of bond material of the second layer 208. It will be appreciated that the content of the pyrite material can be within a range between any of the values noted above. In a particular illustrative embodiment, the content of the pyrite material can be within a range of about 6 vol % to about 11 vol % for a total volume of the bond material of the second layer 208.

In certain instances, the one or more filler materials of the second layer 208 can include at least about 2 vol % cryolite material for a total volume of bond material of the second layer 208, at least about 5 vol % cryolite material for a total volume of bond material of the second layer 208, or at least about 8 vol % cryolite material for a total volume of bond material of the second layer 208. Also, the one or more filler materials of the second layer 208 can include no greater than about 16 vol % cryolite material for a total volume of bond material of the second layer 208, no greater than about 13 vol % cryolite material for a total volume of bond material of the second layer 208, or no greater than about 10 vol % cryolite material for a total volume of bond material of the second layer 208. It will be appreciated that the content of the cryolite material can be within a range between any of the values noted above. In a particular illustrative embodiment, the content of the cryolite material can be within a range of about 5 vol % to about 13 vol % for a total volume of the bond material of the second layer 208.

In other embodiments, the one or more filler materials of the second layer 208 can include at least about 2 vol % calcium carbonate material for a total volume of bond material of the second layer 208, at least about 5 vol % calcium carbonate material for a total volume of bond material of the second layer 208, or at least about 8 vol % calcium carbonate material for a total volume of bond material of the second layer 208. In additional embodiments, the one or more filler materials of the second layer 208 can include no greater than about 16 vol % calcium carbonate material for a total volume of bond material of the second layer 208, no greater than about 13 vol % calcium carbonate material for a total volume of bond material of the second layer 208, or no greater than about 10 vol % calcium carbonate material for a total volume of bond material of the second layer 208. It will be appreciated that the content of the calcium carbonate material can be within a range between any of the values noted above. In a particular illustrative embodiment, the content of calcium carbonate material can be within a range of about 5 vol % to about 13 vol % for a total volume of the bond material of the second layer 208.

In particular embodiments, the second layer 208 can include an amount of porosity, such as at least about 12 vol % porosity for a total volume of the second layer 208, at least about 17 vol % porosity for a total volume of the second layer 208, or at least about 22 vol % porosity for a total volume of the second layer 208. In additional cases, the second layer 208 can include no greater than about 35 vol % porosity for a total volume of the second layer 208, no greater than about 30 vol % porosity for a total volume of the second layer 208, or no greater than about 25 vol % porosity for a total volume of the second layer 208. It will be appreciated that the porosity of the second layer 208 can be within a range between any of the values noted above. In a particular illustrative embodiment, the porosity of the second layer 208 can be within a range of about 17 vol % to about 25 vol % for a total volume of the second layer 208.

Figure 3:
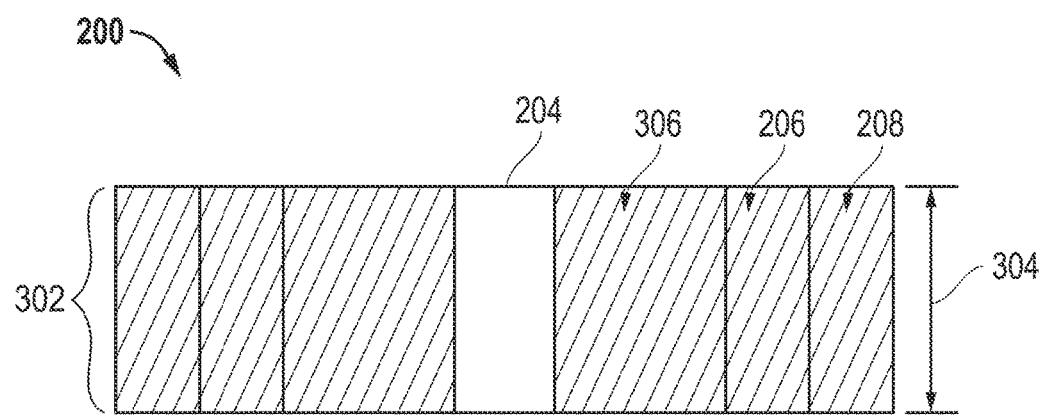
FIG. 3 includes cross-sectional view of the grinding wheel of FIG. 2 according to an embodiment.

FIG. 3 includes a cross-sectional view of the grinding wheel 200 of FIG. 2 according to an embodiment. In the illustrative embodiment of FIG. 3, the grinding wheel 200 has a mounting hole 204 and a layer 302. The layer 302 can include abrasive particles contained within a bond material. The layer 302 can also have an axial thickness 304.

In some instances, the abrasive particles contained within the bond material can be distributed in one or more radial layers of the layer 302, such as the first layer 206 and the second layer 208. The layer 302 can also include an additional portion 306. In certain situations, the additional portion 306 can comprise a core of the grinding wheel 200. In other cases, the additional portion 306 can comprise abrasive particles, bond material, filler material, other components, or a combination thereof.

Figure 4:
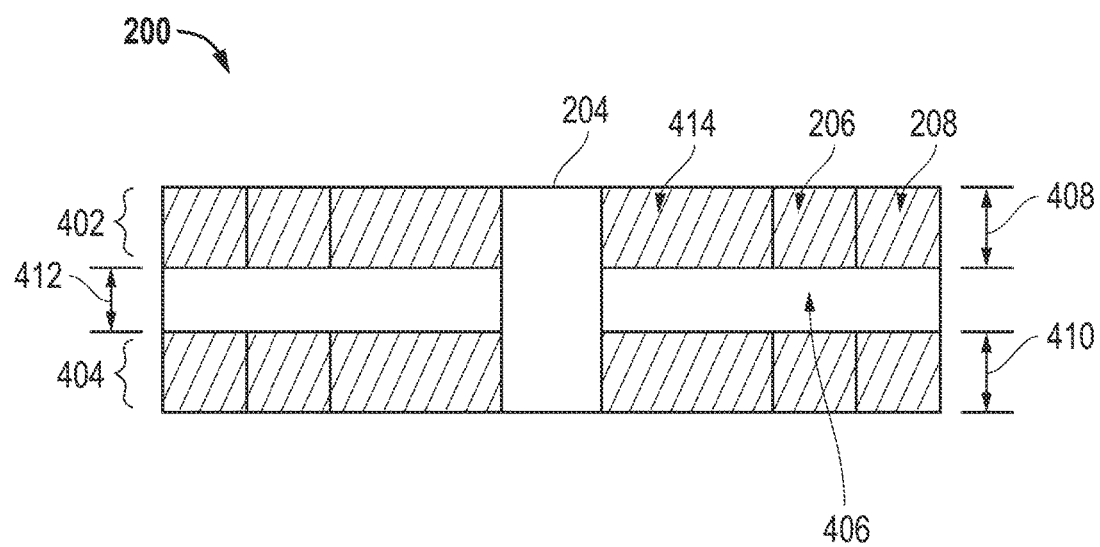
FIG. 4 includes a cross-sectional view of the grinding wheel of FIG. 2 in accordance with another embodiment.

FIG. 4 includes a cross-sectional view of the grinding wheel 200 of FIG. 2 in accordance with another embodiment. In the illustrative embodiment of FIG. 4, the grinding wheel 200 has a mounting hole 204, a first axial layer 402 and a second axial layer 404. The grinding wheel 200 can also include a reinforcement layer 406. The first axial layer 402 and the second axial layer 404 can include abrasive particles contained within a bond material. In some cases, the content of abrasive particles and the content of bond material of the first axial layer 402 and the second axial layer 404 can be substantially the same, while in other situations, the content of the abrasive particles and the content of the bond material of the first axial layer 402 and the second axial layer 404 can be different.

The first axial layer 402 can have a thickness 408 and the second axial layer 404 can have a thickness 410. In addition, the reinforcement layer 406 can have a thickness 412. In some scenarios, the thickness 408 can be substantially the same as the thickness 410, while in other embodiments, the thickness 408 can be different from the thickness 410. Furthermore, the thickness 412 can be substantially the same or different with respect to the thickness 408, the thickness 410, or both.

In some cases, the abrasive particles contained within the bond material can be distributed in one or more layers of the first axial layer 402, the second axial layer 404, or both. For example, in the illustrative embodiment of FIG. 4, the first axial layer 402 and the second axial layer 404 include the first layer 206 and the second layer 208. The first axial layer 402 and the second axial layer 404 can also include an additional portion 414. In certain situations, the additional portion 414 can comprise a core of the grinding wheel 200. In other cases, the additional portion 414 can comprise abrasive particles, bond material, filler material, other components, or a combination thereof.

Figure 5:
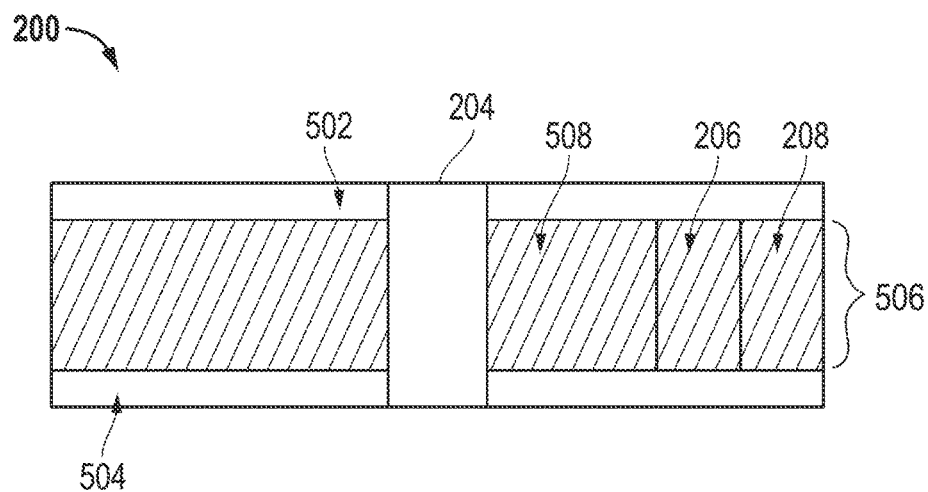
FIG. 5 includes a cross-sectional view of the grinding wheel of FIG. 2 in accordance with an additional embodiment.

FIG. 5 includes a cross-sectional view of the grinding wheel 200 of FIG. 2 in accordance with an additional embodiment. In the illustrative embodiment of FIG. 5, the grinding wheel 200 includes a mounting hole 204, a first reinforcement layer 502 and a second reinforcement layer 504. The grinding wheel 200 also includes a layer 506 that includes abrasive particles contained within a bond material. In certain situations, the abrasive particles contained within the bond material can be distributed in one or more radial layers of the layer 506, such as the first layer 206 and the second layer 208. The layer 506 can also include an additional portion 508. In certain situations, the additional portion 508 can comprise a core of the grinding wheel 200. In other cases, the additional portion 508 can comprise abrasive particles, bond material, filler material, other components, or a combination thereof.

Figure 6:
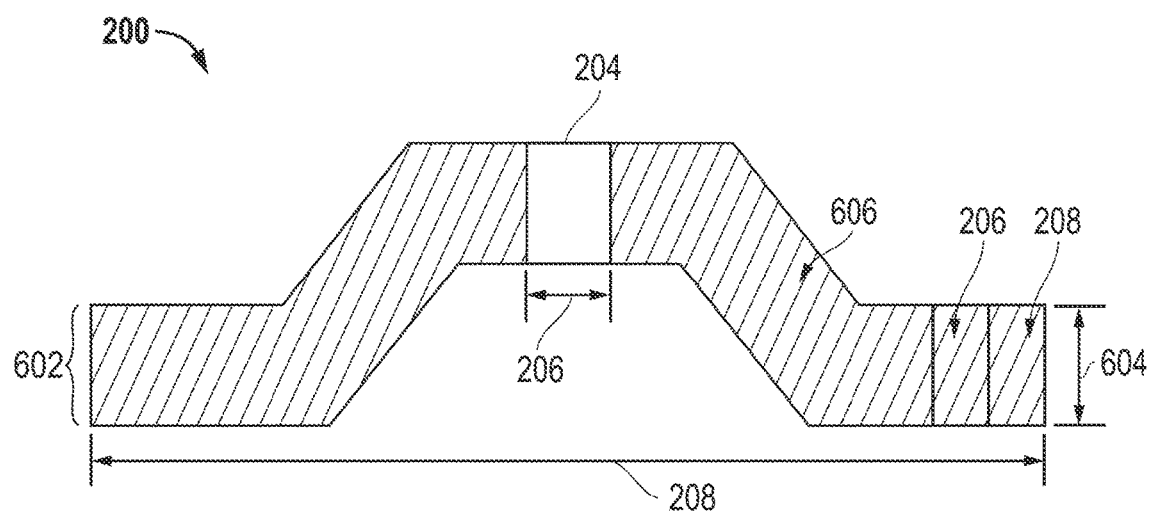
FIG. 6 includes a cross-sectional view of the grinding wheel of FIG. 2 having a depressed center configuration in accordance with an embodiment.

FIG. 6 includes a cross-sectional view of the grinding wheel 200 of FIG. 2 having a depressed center configuration in accordance with an embodiment. In the illustrative embodiment of FIG. 6, the grinding wheel 200 includes a mounting hole 204 having a diameter 206 and a layer 602 having an axial thickness 604. The grinding wheel 200 also includes an outer diameter 208.

The layer 602 can include abrasive particles contained within a bond material. In some aspects, the abrasive particles contained within the bond material can be distributed in one or more radial layers of the layer 602, such as the first layer 206 and the second layer 208. The layer 602 can also include an additional portion 606. In a particular embodiment, the additional portion 606 can comprise a core of the grinding wheel 200. In other cases, the additional portion 606 can comprise abrasive particles, bond material, filler material, other components, or a combination thereof.

Figure 7:
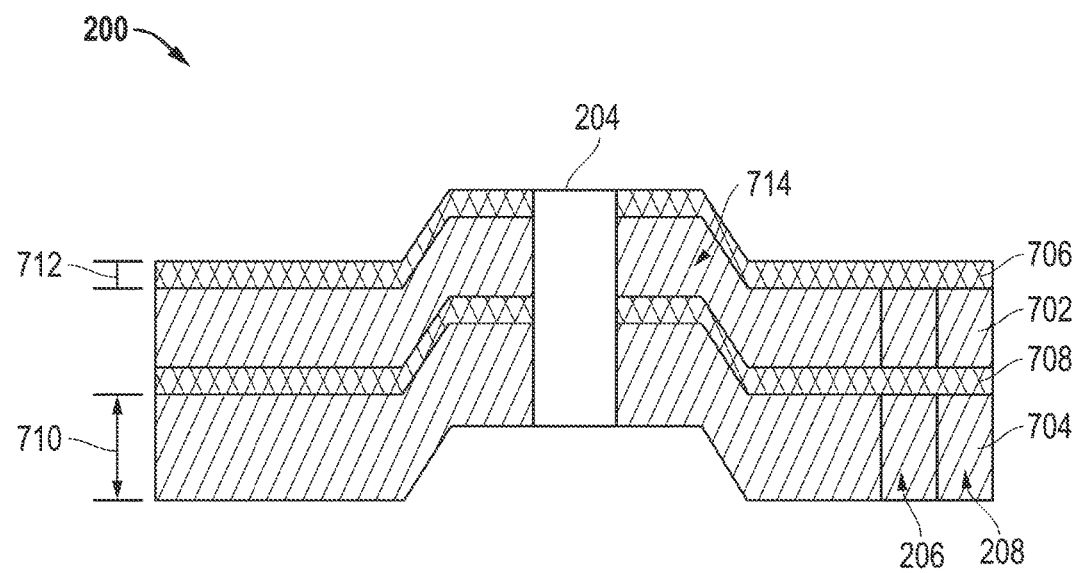
FIG. 7 includes a cross-sectional view of the grinding wheel of FIG. 2 having a depressed center configuration in accordance with another embodiment.

FIG. 7 includes a cross-sectional view of the grinding wheel 200 of FIG. 2 having a depressed center configuration in accordance with another embodiment. In the illustrative embodiment of FIG. 7, the grinding wheel 200 includes a mounting hole 204. The grinding wheel 200 also includes a first axial layer 702 and a second axial layer 704. Additionally, the grinding wheel 200 includes a first reinforcement layer 706 and a second reinforcement layer 708. Further, the first axial layer 702 and the second axial layer 704 can each have a respective axial thickness, such as thickness 710. The first reinforcement layer 706 and the second reinforcement layer 708 can each have a respective axial thickness, such as thickness 712.

The axial layer 702 can include abrasive particles contained within a bond material. In some aspects, the abrasive particles contained within the bond material can be distributed in one or more radial layers of the first axial layer 702, such as the first layer 206 and the second layer 208. The first axial layer 702 can also include an additional portion 714. In a particular embodiment, the additional portion 714 can comprise a core of the grinding wheel 200. In other cases, the additional portion 714 can comprise abrasive particles, bond material, filler material, other components, or a combination thereof.

In certain situations, the radial layers 206 and 208 may be absent from the grinding wheel 200 illustrated in FIG. 7 and the first axial layer 702 can be configured as a grinding layer and the second axial layer 704 can be configured as a support layer for the first axial layer 702.

Figure 8:
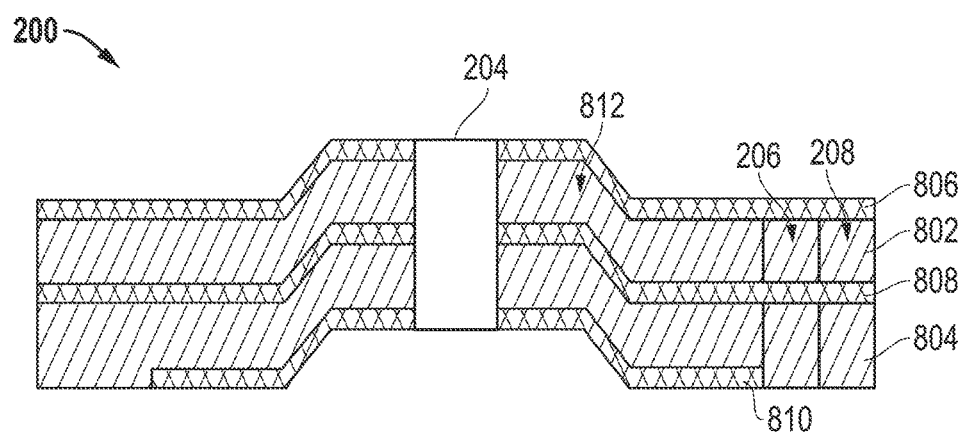
FIG. 8 includes a cross-sectional view of the grinding wheel of FIG. 2 having a depressed center configuration in accordance with an additional embodiment.

FIG. 8 includes a cross-sectional view of the grinding wheel 200 of FIG. 2 having a depressed center configuration in accordance with an additional embodiment. In the illustrative embodiment of FIG. 8, the grinding wheel 200 includes a mounting hole 204, a first axial layer 802, and a second axial layer 804. The grinding wheel 200 also includes a first reinforcement layer 806, a second reinforcement layer 808, and a third reinforcement layer 810. In some cases, as in the illustrative embodiment of FIG. 8, a portion of the second axial layer 804 can be in contact with the third reinforcement layer 810.

The first axial layer 802 and the second axial layer 804 can include abrasive particles contained within a bond material. In some aspects, the abrasive particles contained within the bond material can be distributed in one or more radial layers of the first axial layer 802 and the second axial layer 804, such as the first layer 206 and the second layer 208. The first axial layer 802 and the second axial layer 804 can also include an additional portion 812. In a particular embodiment, the additional portion 812 can comprise a core of the grinding wheel 200. In other cases, the additional portion 812 can comprise abrasive particles, bond material, filler material, other components, or a combination thereof.

Figure 9:
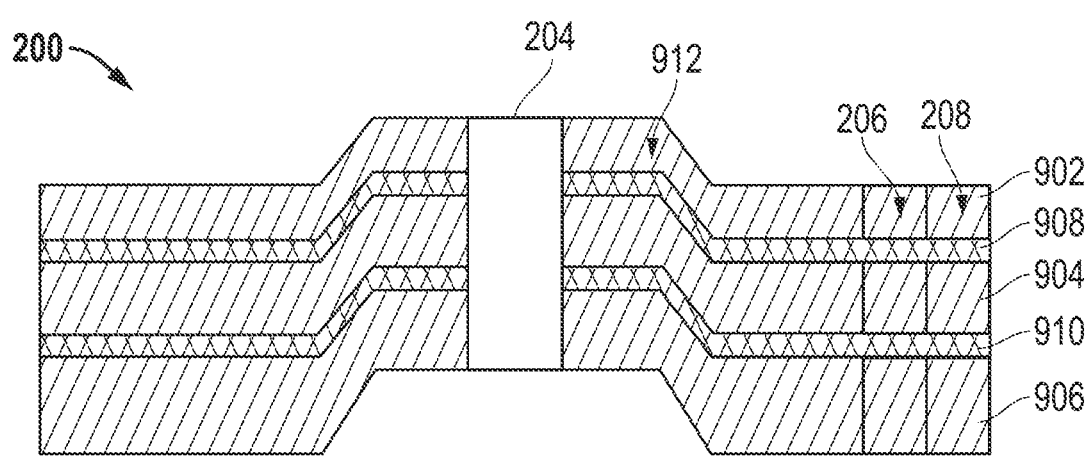
FIG. 9 includes a cross-sectional view of the grinding wheel of FIG. 2 having a depressed center configuration in accordance with a further embodiment.

FIG. 9 includes a cross-sectional view of the grinding wheel 200 of FIG. 2 having a depressed center configuration in accordance with a further embodiment. In the illustrative embodiment of FIG. 9, the grinding wheel 200 includes a mounting hole 204, a first axial layer 902, a second axial layer 904, and a third axial layer 906. The grinding wheel 200 also includes a first reinforcement layer 908 and a second reinforcement layer 910.

The first axial layer 902, the second axial layer 904, and the third axial layer 906 can include abrasive particles contained within a bond material. In some aspects, the abrasive particles contained within the bond material can be distributed in one or more radial layers of the first axial layer 902, the second axial layer 904, and the third axial layer 906, such as the first layer 206 and the second layer 208. The first axial layer 902, the second axial layer 904, and the third axial layer 906 can also include an additional portion 912. In a particular embodiment, the additional portion 912 can comprise a core of the grinding wheel 200. In other cases, the additional portion 912 can comprise abrasive particles, bond material, filler material, other components, or a combination thereof.

EXAMPLES

Sample cutting wheels are formed according to embodiments described herein. For example, sample 1 includes a grinding layer having abrasive particles that consist essentially of brown fused alumina. Sample 1 includes about 47 vol % to about 49 vol % brown fused alumina for a total volume of sample 1. Additionally, sample 1 includes a bond material including about 26 vol % to about 28 vol % resin bond material, about 3 vol % to about 4 vol % cryolite material, and about 3 vol % to about 4 vol % $CaCO_3$ for a total volume of sample 1. Further, sample 1 has porosity of about 17 vol % to about 19 vol % for a total volume of sample 1.

In another example, sample 2 has a grinding layer with abrasive particles comprising about 47 vol % to about 49 vol % abrasive particles for a total volume of sample 2. The abrasive particles of sample 2 include brown fused alumina within a range of about 68 vol % to about 72 vol % and black alumina within a range of about 28 vol % to about 32 vol % for a total volume of the abrasive particles of sample 2. The grinding layer of Sample 2 also has a suitable bond composition that includes about 26 vol % to about 28 vol % phenolic resin, about 3 vol % to about 4 vol % cryolite material, and about 3 vol % to about 4 vol % $CaCO_3$ for a total volume of sample 2. Sample 2 also includes about 17 vol % to about 19 vol % porosity for a total volume of sample 2.

In a further example, sample 3 has a grinding layer with abrasive particles comprising about 47 vol % to about 49 vol % abrasive particles for a total volume of sample 3. The abrasive particles of sample 3 include black alumina within a range of about 48 vol % to about 52 vol % and brown fused alumina within a range of about 48 vol % to about 52 vol %. In an additional example, sample 4 has a grinding layer with abrasive particles comprising about 47 vol % to about 49 vol % abrasive particles for a total volume of sample 4. The abrasive particles of sample 4 include black alumina within a range of about 68 vol % to about 72 vol % and brown fused alumina within a range of about 28 vol % to about 32 vol %.

Sample 5 has a grinding layer with abrasive particles comprising about 47 vol % to about 49 vol % abrasive grains for a total volume of sample 5. The abrasive grains of sample 5 consist essentially of black alumina. The grinding layers of Samples 3-5 have substantially the same bond composition and porosity as the bond composition and porosity of the grinding layer of Sample 2.

Figure 10:
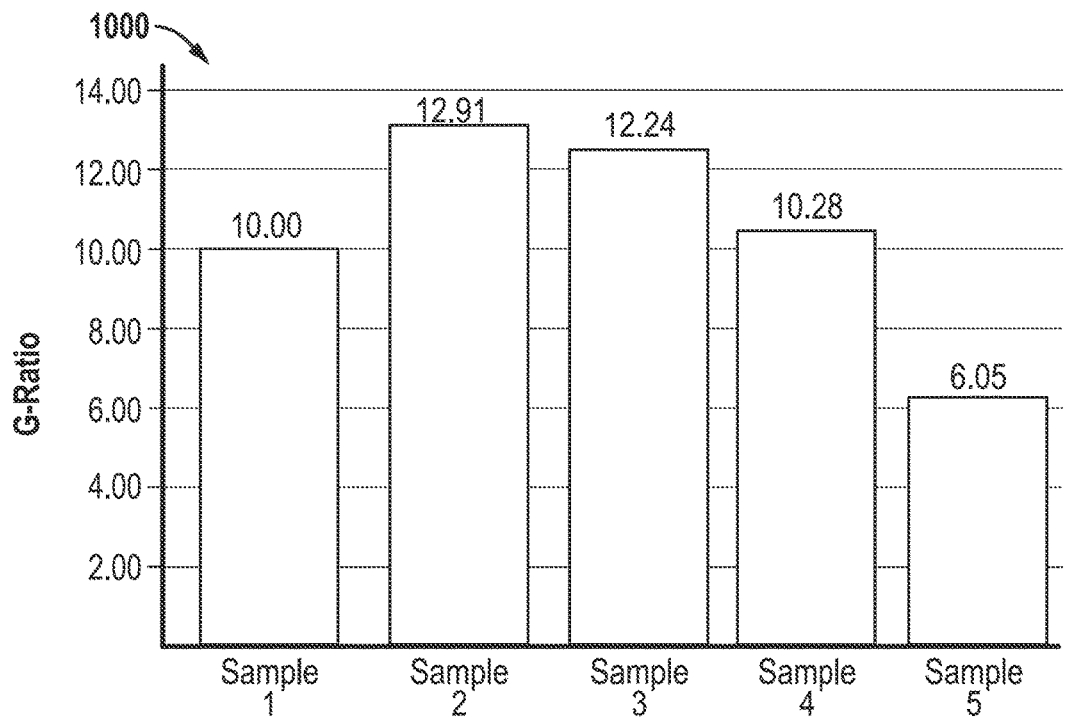
FIG. 10 includes a chart indicating a G-ratio for grinding wheels with grinding layers having different amounts of black alumina abrasive particles.
Figure 11:
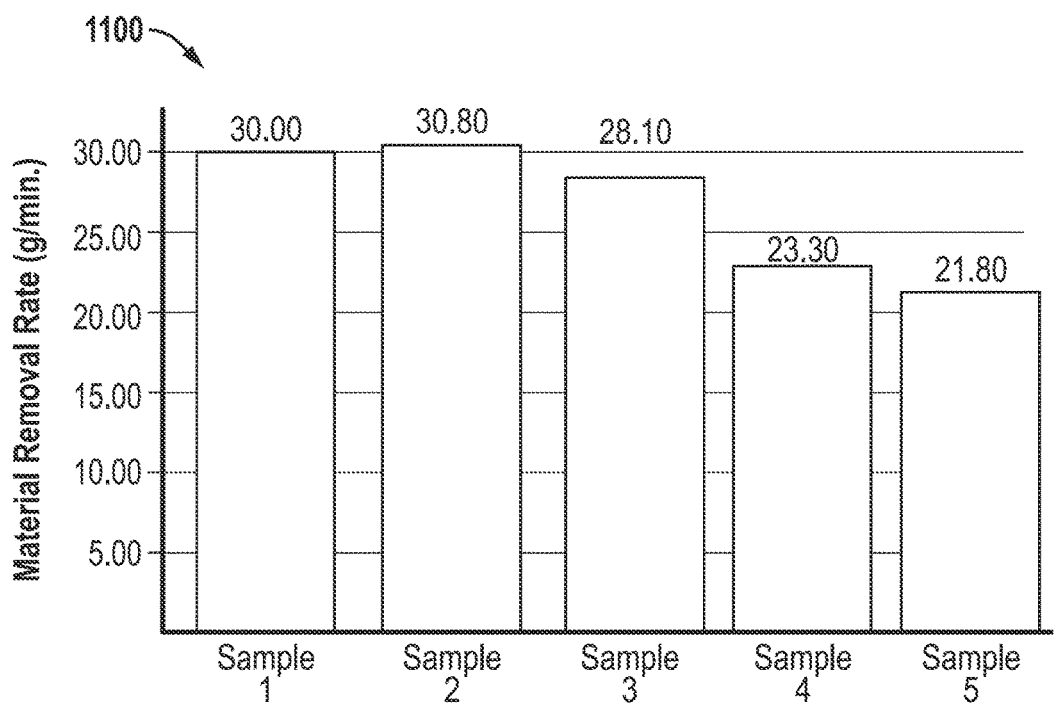
FIG. 11 includes a chart indicating material removal rate for grinding wheels having a grinding layer with different amounts of black alumina abrasive particles.

Samples 1-5 are used to grind a suitable material. The grinding test is performed with a 220 volt and 1.4 KW Dewalt DW830-A9 tool operating at a working current of about 6.5 A with a speed of about 10,000 rotations per minute. The workpieces are 10 mm thick carbon steel plates and the grinding test is conducted for a duration of about 5 minutes. FIG. 10 includes a chart 1000 indicating a G-ratio for grinding wheels having a grinding layer with different amounts of black alumina abrasive particles. G-ratio as used herein indicates an amount of material removed from the workpiece relative to an amount of material removed from the grinding wheel. FIG. 11 includes a chart 1100 indicating material removal rate for grinding wheels having a grinding layer with different amounts of black alumina abrasive particles.

Figure 12:
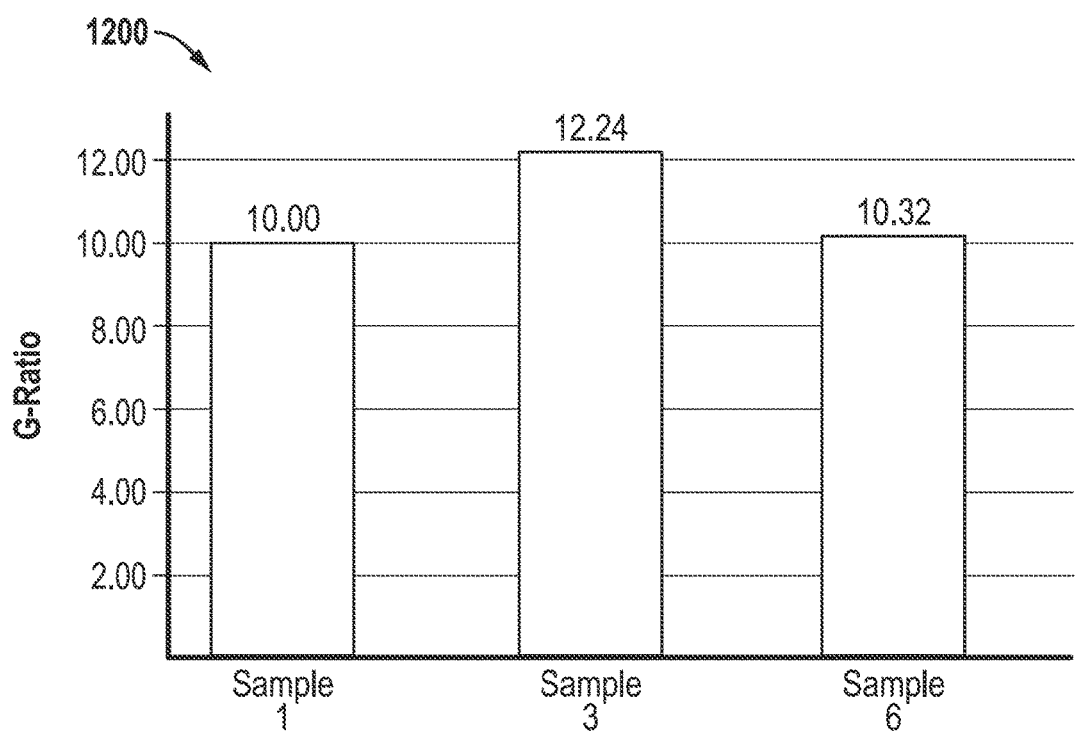
FIG. 12 includes a chart indicating a G-ratio for grinding wheels with a grinding layer having different bond materials in accordance with embodiments herein.
Figure 13:
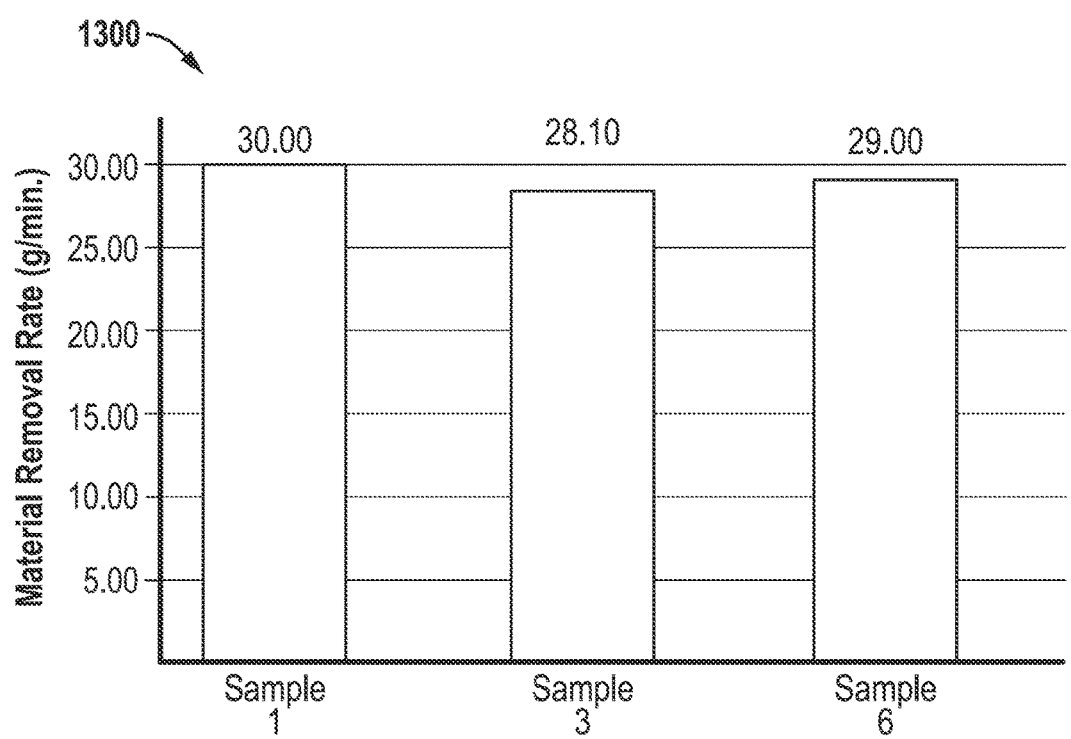
FIG. 13 includes a chart indicating material removal rate for grinding wheels having a grinding layer with different bond materials in accordance with embodiments herein.

In addition, another grinding wheel, Sample 6, is made according to embodiments herein with a grinding layer having a bond composition that is different from that of Samples 1 and 3. Sample 6 includes a grinding layer with abrasive particles comprising about 47 vol % to about 49 vol % abrasive particles for a total volume of sample 6. The abrasive particles of sample 6 include black alumina within a range of about 48 vol % to about 52 vol % and brown fused alumina within a range of about 48 vol % to about 52 vol %. In addition, the bond composition of sample 6 includes about 23 vol % to about 25 vol % phenolic resin, about 2 vol % to about 4 vol % cryolite material, and about 2 vol % to about 4 vol % $CaCO_3$ for a total volume of sample 6. Sample 6 also includes about 21 vol % to about 23 vol % porosity for a total volume of sample 6. FIG. 12 includes a chart 1200 indicating a G-ratio for grinding wheels having a grinding layer with different bond materials in accordance with embodiments herein. FIG. 13 includes a chart 1300 indicating material removal rate for grinding wheels having a grinding layer with different bond materials in accordance with embodiments herein.

The foregoing embodiments are directed to abrasive products, and particularly bonded abrasive grinding wheels, which represent a departure from the state-of-the-art. The grinding wheels of the embodiments herein utilize a combination of features that facilitate improved performance over conventional grinding wheels. As described in the present application, the grinding wheels of the embodiments herein utilize a particular amount and type of abrasive particles, particular amount and type of bond material, and have a particular amount of porosity. For example, since the abrasive products described herein are directed to low force per grit grinding operations, the bond composition is a softer bond composition than the bond materials used for high force per grit operations. In addition to the discovery that such products could be formed effectively, despite being outside of the known realm of conventional abrasive products in terms of their grade and structure, it was also discovered that such products demonstrated improved grinding performance. In fact, quite unexpectedly, as indicated in FIG. 10 and FIG. 11, the grinding wheels of the embodiments herein having increasing amounts of black alumina, such as Samples 2 and 3, demonstrated higher G-ratios than wheels having brown-fused alumina abrasive particles, while also having material removal rates that are comparable to grinding wheels having a greater content of brown fused alumina. In particular, the G-ratios of Samples 2 and 3 are about 20% to about 30% higher than the G-ratio of Sample 1. The increased performance of the grinding wheels including greater amounts of black alumina is unexpected because the hardness of black alumina is less than that of brown fused alumina. In addition, black alumina has a decreased content of aluminum oxide with respect to the aluminum oxide content of brown fused alumina. The performance increase with respect to Samples 2 and 3 is also unexpected based on the lighter weight of Samples 2 and 3 due to the decreased density of the black alumina abrasive particles. Without being tied to a particular theory, the performance of Samples 2 and 3 is improved over that of Sample 1 as a result of the increased grain friability of the black alumina abrasive grains due to the multiple phases of the black alumina described previously. Furthermore, as indicated in FIG. 12 and FIG. 13, the use of certain bond material compositions provides a material removal rate comparable to that of grinding wheels including greater content of brown fused alumina, while still maintaining a G-ratio greater than that of the grinding wheels including greater content of brown fused alumina. Without being bound to a particular theory, the improved performance of the samples including black alumina can be due to the black alumina not being as aggressive an abrasive particle as the brown fused alumina due to the increased amount of impurities in the black alumina. Thus, the wheel wear is low and a softer bond is introduced to balance material removal rate and wheel life.

In other embodiments, an additional heat treatment process of black alumina was included. Versions of the black alumina heat treatment process included grain heat treatment at a temperature in a range of about 800° C. to about 1300° C. The heating rate was 5° C./min, and the holding time at the maximum temperature was 10 minutes. Finally, the samples were furnace cooled to room temperature. In other examples, heat treating the black alumina of the first type of abrasive particle prior to providing the abrasive mixture, can include heating the black alumina of the first type of abrasive particle. The black alumina may be heat treated to a temperature of at least about 800° C., such as at least about 900° C., or even at least about 1000° C. In other versions, the temperature can be not greater than about 1100° C., such as not greater than about 1000° C., even or not greater than about 900° C. In addition, the temperature can be in a range between any of these minimum and maximum values.

Figure 14:
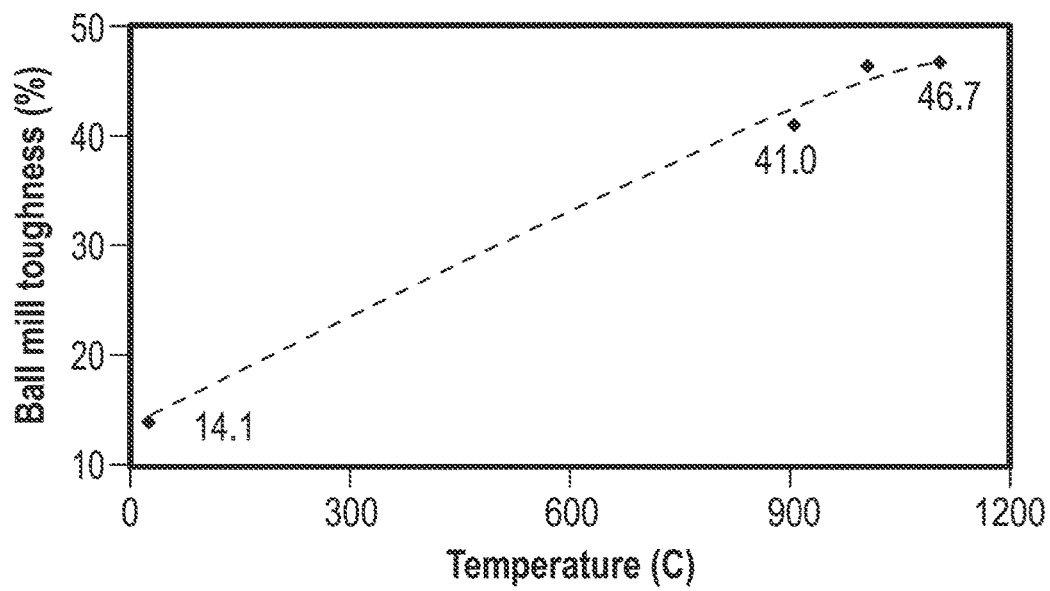
FIG. 14 includes a chart indicating ball mill toughness of black alumina over a range of heat treatment temperatures.

After the heat treatment, there is a significant increase in ball mill toughness of the black alumina grains, as depicted in FIG. 14. The ball mill toughness of the black alumina grains were tested pursuant to ANSI B74.8-1987 (R2001). The increase in ball mill toughness could be attributed to changes in the grain in three aspects: change of grain shape (e.g., more circular grain, higher toughness), change of microstructure (e.g., healing of cracks, etc.), and phase change. For example, the black alumina of the first type of abrasive particle can have a ball mill toughness of at least about 38%, such as at least about 39%, at least about 40%, at least about 42%, at least about 43%, at least about 44%, or even at least about 45%. In other versions, the ball mill toughness can be no greater than about 50%, such as no greater than about 49%, no greater than about 48%, or even no greater than about 47%. In addition, the ball mill toughness can be in a range between any of these minimum and maximum values.

Figure 15:
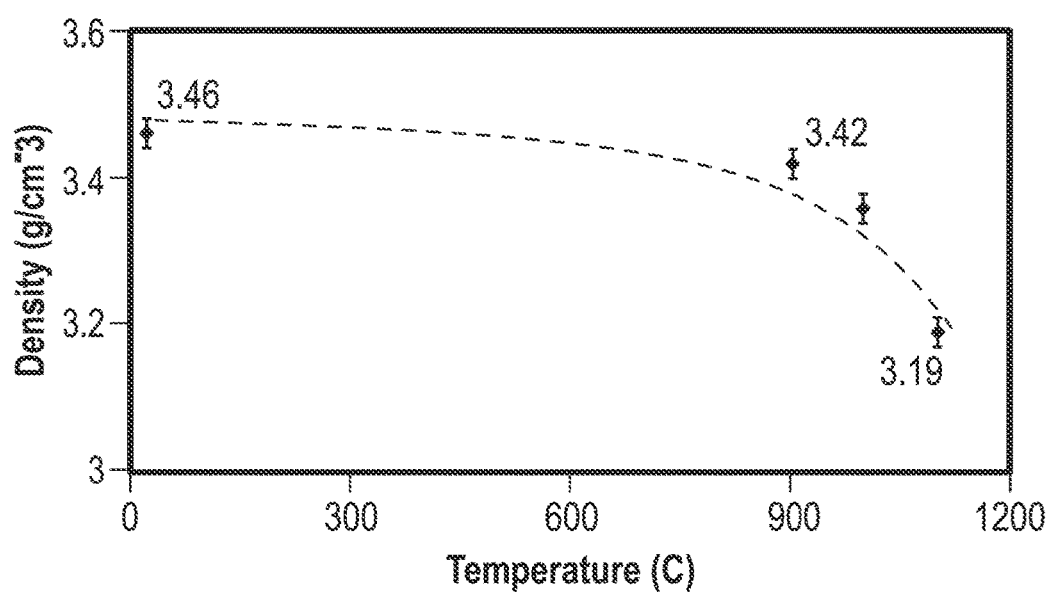
FIG. 15 includes a chart indicating density of black alumina over a range of heat treatment temperatures.

As shown in FIG. 15, the density of the black alumina also decreases with elevated heat treatment. For example, the density can be no greater than about 3.9 g/cm$^3$, such as no greater than about 3.8 g/cm$^3$, no greater than about 3.7 g/cm$^3$, no greater than about 3.6 g/cm$^3$, no greater than about 3.5 g/cm$^3$, no greater than about 3.4 g/cm$^3$, no greater than about 3.3 g/cm$^3$, or even no greater than about 3.2 g/cm$^3$. Alternatively, the density can be at least about 3.0 g/cm3, such as at least about 3.1 g/cm3, at least about 3.2 g/cm3, at least about 3.3 g/cm3, or even at least about 3.4 g/cm3. The density also may be in a range between any of these minimum and maximum values.

Figure 16:
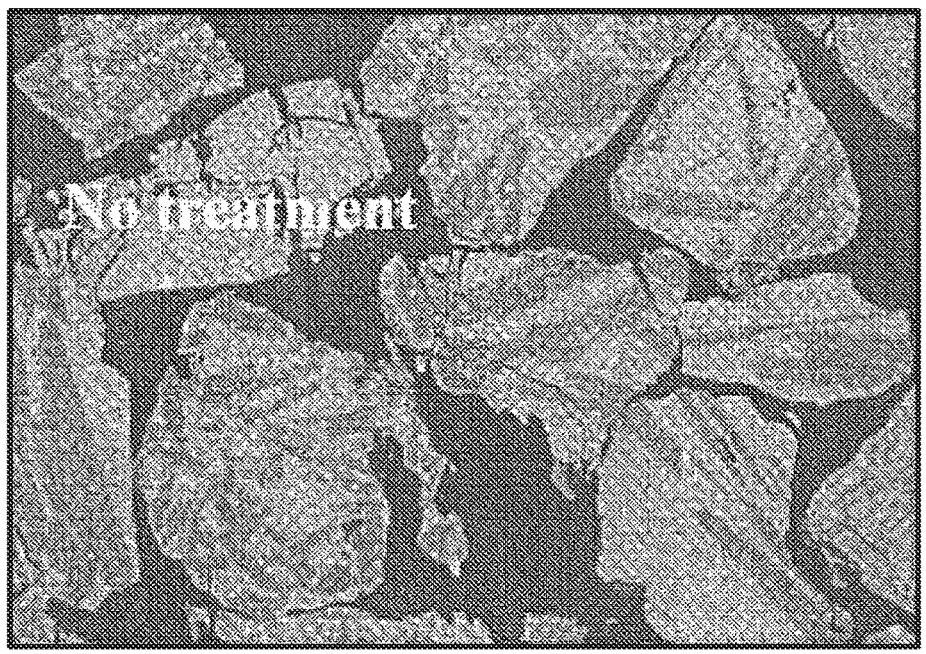
FIGS. 16 and 17 include photographs of black alumina without heat treatment and with heat treatment, respectively.
Figure 17:
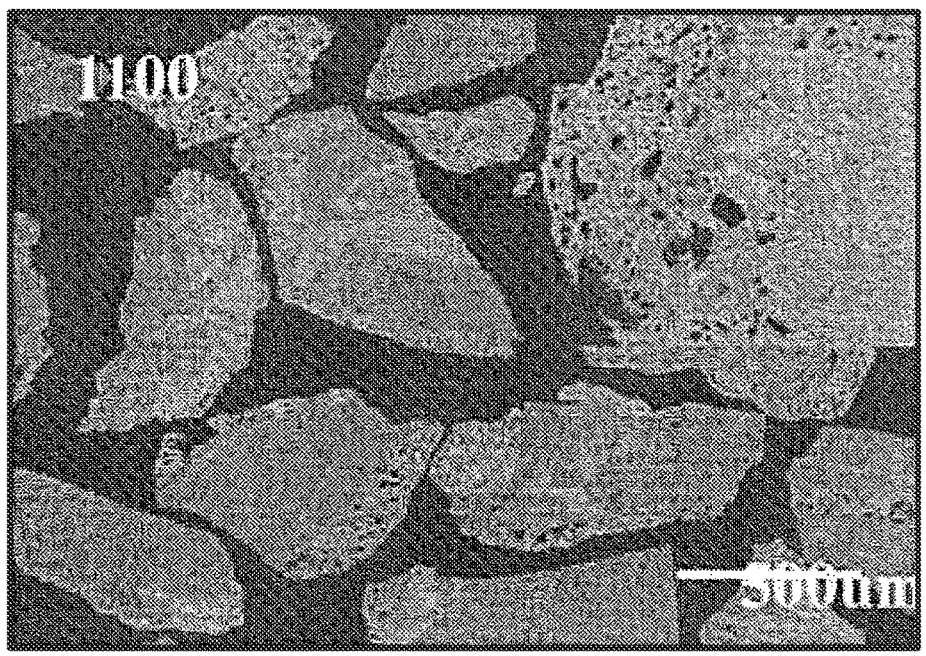

The change in density could be attributed to the change in porosity, as depicted in FIGS. 16 and 17. FIGS. 16 and 17 include scanning electron microscope (SEM) photographs of black alumina without heat treatment and with heat treatment, respectively. After heat treatment, the microstructure of black alumina improved in terms of micro-crack reduction, especially for those micro-cracks inside the secondary phases. As shown in the SEM photographs, most of the micro-cracks were healed. This appears to be a contribution to the increase of the toughness after heat treatment.

Figure 18:
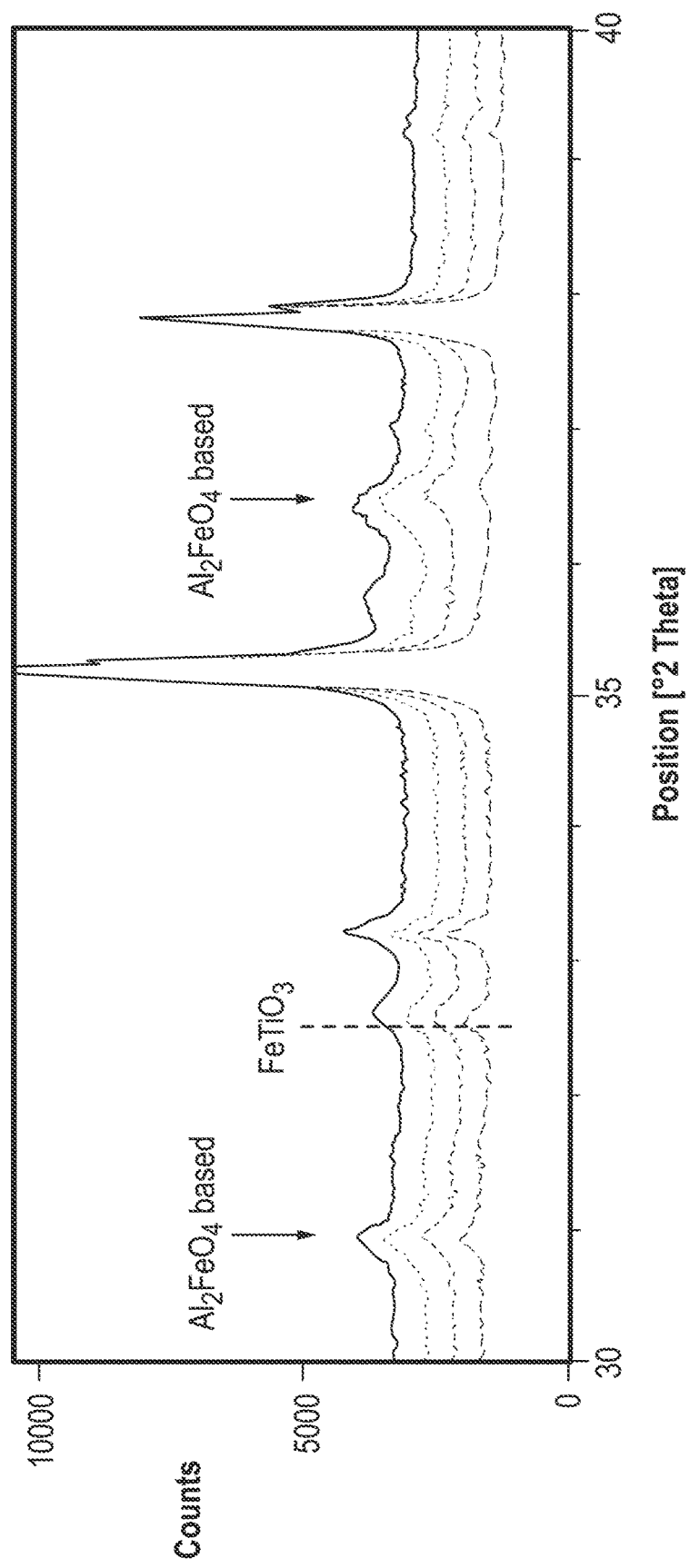
FIGS. 18 and 19 include an analysis of spectra of black alumina, both with and without heat treatment, at various temperatures.
Figure 19:
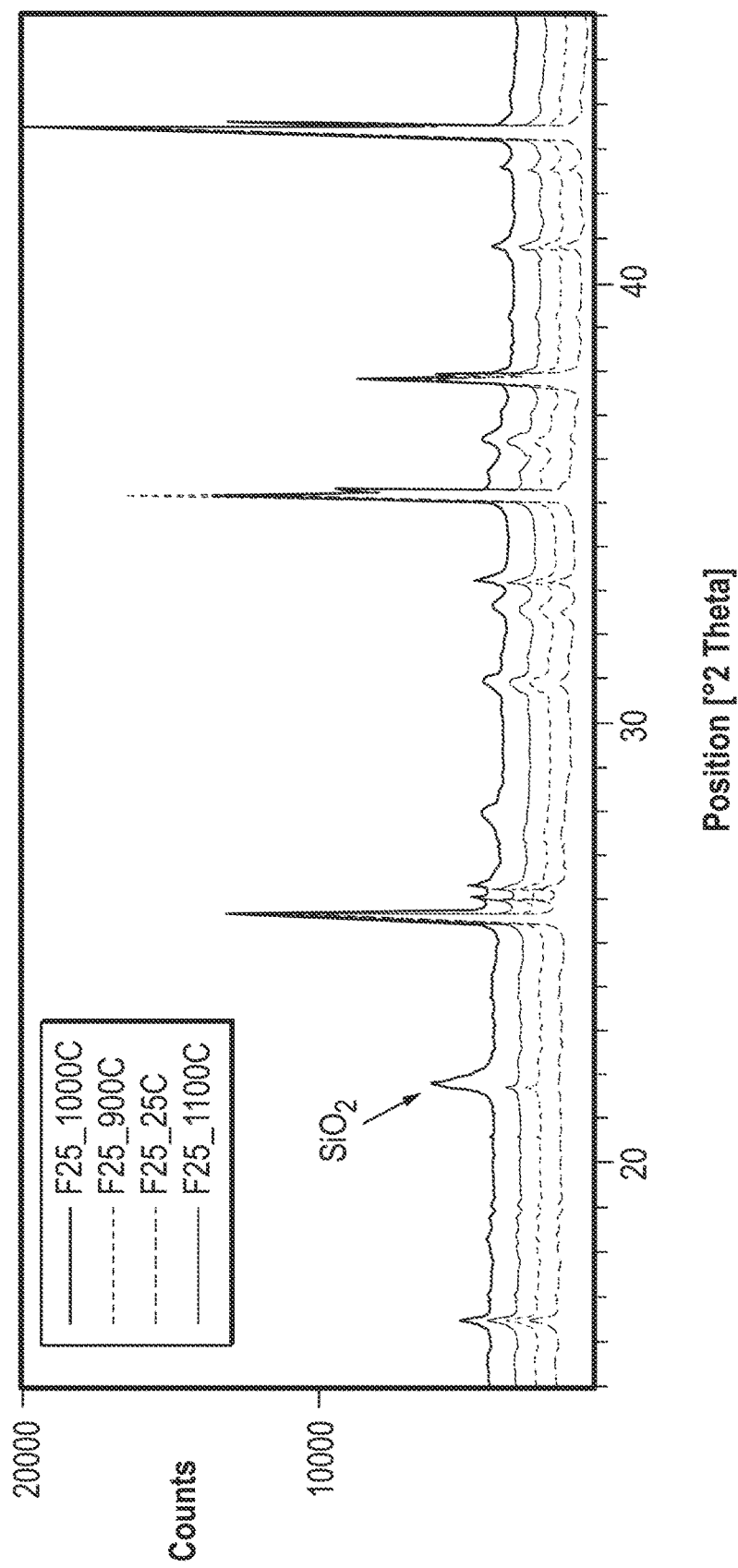

FIGS. 18 and 19 include analysis of x-ray diffraction (XRD) spectra of black alumina, both with and without heat treatment, at various temperatures. When heat treatment temperature is above 900° C., it is observed from XRD that the phase transformation occurs (from the secondary or minor phases) and the crystalline silica phase appears. In addition, the main phase of the black alumina grains remains as $Al_2O_3$. For example, FIG. 19 indicates that crystalline silica will come out of the black alumina when the heat treatment temperature exceeds about 900° C.

Figure 20:
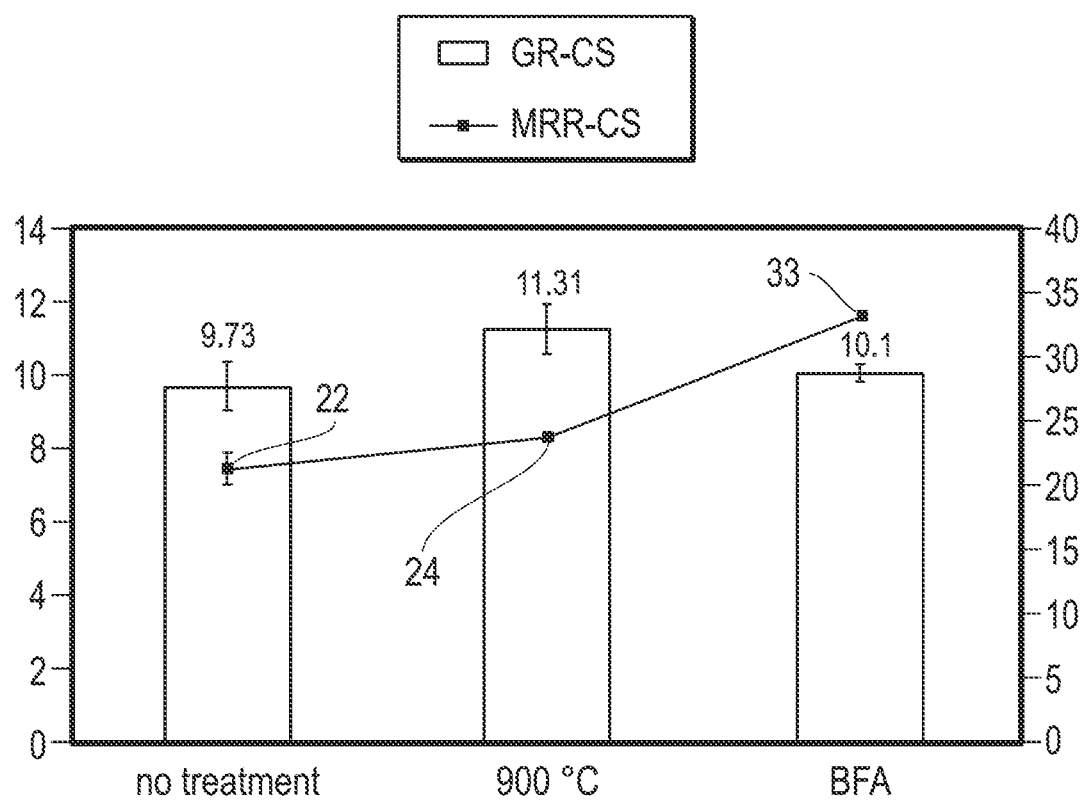
FIG. 20 includes a chart indicating both G-ratio and material removal rate for grinding wheels having abrasive particles comprising (from left to right) black alumina without heat treatment, black alumina with heat treatment, and brown fused alumina with no heat treatment.

FIG. 20 includes a chart indicating both G-ratio and material removal rate for grinding wheels having abrasive particles comprising (from left to right) black alumina without heat treatment (i.e., "no treatment"), black alumina with heat treatment (i.e., "900° C."), and brown fused alumina with no heat treatment (i.e., "BFA"). The heat treated black alumina had an average G-ratio of about 11.31, and an average material removal rate (MRR) of about 24 g/min. In contrast, the BFA had an average G-ratio of about 10.1, and an average MRR of about 22 g/min. Thus, the heat treated black alumina outperformed BFA by about 12% with regard to G-ratio, and by about 9% with regard to MRR.

In other embodiments, abrasive articles formed with heat treated black alumina outperform abrasive articles formed with BFA with regard to G-ratio by at least about 5%, such as at least about 10%, and not greater than about 25%, such as not greater than about 20%. In other embodiments, abrasive articles formed with heat treated black alumina outperform abrasive articles formed with BFA with regard to MRR by at least about 3%, such as at least about 6%, and not greater than about 20%, such as not greater than about 15%. In addition, the performance can be in a range between any of these minimum and maximum values.

Other versions of the grinding tool may include black alumina that is heat treated and has an average G-ratio of at least about 10.5, such as at least about 11, or even at least about 11.3. In still other versions, the heat treated black alumina can have an average material removal rate (MRR) of at least about 22.5 g/min, such as at least about 23 g/min, or at least about 24 g/min. Again, the performance can be in a range between any of these minimum and maximum values.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A grinding tool comprising:
    a body having a first layer, the first layer including:
        a bond material that is at least about 20 vol % of a total volume of the first layer;
        a filler; and
        abrasive particles contained within the bond material, the abrasive particles including a first type of the abrasive particle including black alumina and a second type of abrasive particle including brown fused alumina, wherein at least about 10 vol % of a total volume of the abrasive particles includes black alumina.

2. A grinding tool comprising:
    a body including:
        a first layer including:
            about 25 vol % to about 33 vol % bond material for a total volume of the first layer, the bond material comprising about 20 vol % to about 30 vol % of a phenolic resin material for the total volume of the first layer and about 4 vol % to about 8 vol % of a filler for the total volume of the first layer;
            about 39 vol % to about 51 vol % abrasive particles for the total volume of the first layer, the abrasive particles comprising about 15 vol % to about 30 vol % black alumina abrasive particles for the total volume of the first layer and about 15 vol % to about 30 vol % brown fused alumina abrasive particles for the total volume of the first layer; and
            about 16 vol % to about 25 vol % porosity for the total volume of the first layer;
        a second layer including:
            about 22 vol % to about 30 vol % bond material for a total volume of the second layer, the bond material comprising about 14 vol % to about 27 vol % of a phenolic resin material for the total volume of the second layer and about 4 vol % to about 10 vol % of a filler for the total volume of the second layer;
            about 46 vol % to about 54 vol % abrasive particles for the total volume of the second layer, the abrasive particles consisting essentially of black alumina; and
            about 17 vol % to about 25 vol % porosity for the total volume of the second layer.

3. The grinding tool of claim 1, wherein at least about 32 vol % of a total volume of the first layer includes the abrasive particles, and no greater than about 65 vol % of a total volume of the first layer includes the abrasive particles.

4. The grinding tool of claim 1, wherein a content of the first type of abrasive particle is within about 10% of a content of the second type of abrasive particle.

5. The grinding tool of claim 1, wherein the filler is selected from the group consisting of a pyrite material, a cryolite material and a potassium aluminum fluoride material.

6. The grinding tool of claim 1, wherein the abrasive particles consist essentially of a mixture of black alumina and brown fused alumina.

7. The grinding tool of claim 1, wherein at least about 50 vol % of a total volume of the abrasive particles of the second layer includes black alumina.

8. The grinding tool of claim 1, wherein the first type of abrasive particles have a density of no greater than about 3.9 g/cm$^3$, and at least about 3.0 g/cm$^3$.

9. The grinding tool of claim 1, wherein the second type of abrasive particles has a density of at least about 3.74 g/cm$^3$.

10. The grinding tool of claim 1, wherein the black alumina includes an alpha alumina phase within a range of about 68 vol % to about 92 vol % of a total volume of the black alumina.

11. The grinding tool of claim 1, wherein the black alumina includes a (Fe, Al, Si)O$_4$ phase within a range of about 12 vol % to about 16 vol % of a total volume of the black alumina.

12. The grinding tool of claim 1, wherein the black alumina includes a FeTiO$_3$ phase within a range of about 4 vol % to about 8 vol % of a total volume of the black alumina.

13. The grinding tool of claim 1, wherein the black alumina comprises Al$_2$O$_3$ within a range of about 60 vol % to about 76 vol % of a total volume of the black alumina, Fe$_2$O$_3$ within a range of about 7 vol % to about 17 vol % of a total volume of the black alumina, SiO$_2$ within a range of about 10 vol % to about 20 vol % of a total volume of the black alumina, and TiO$_2$ within a range of about 2 vol % to about 4 vol % of a total volume of the black alumina.

14. The grinding tool of claim 1, wherein the filler comprises a cryolite material and CaCO$_3$.

15. The cutting wheel of claim 1, wherein the body comprises:
    26-28 vol % bond material for a total volume of the first layer;
    3-4 vol % cryolite material for a total volume of the first layer;
    3-4 vol % CaCO$_3$ for a total volume of the first layer;
    17-19 vol % porosity for a total volume of the first layer;
    47-49 vol % abrasive particles for the total volume of the first layer;
    68-72 vol % brown fused alumina for a total volume of abrasive particles; and
    28-32 vol % black alumina for a total volume of abrasive particles.

16. The cutting wheel of claim 1, wherein the body comprises:
    26-28 vol % bond material for a total volume of the first layer;
    3-4 vol % cryolite material for a total volume of the first layer;

3-4 vol % CaCO$_3$ for a total volume of the first layer;
17-19 vol % porosity for a total volume of the first layer;
47-49 vol % abrasive particles for the total volume of the first layer;
48-52 vol % brown fused alumina for a total volume of abrasive particles; and
48-52 vol % black alumina for a total volume of abrasive particles.

17. The cutting wheel of claim 1, wherein the body comprises:
26-28 vol % bond material for a total volume of the first layer;
3-4 vol % cryolite material for a total volume of the first layer;
3-4 vol % CaCO$_3$ for a total volume of the first layer;
17-19 vol % porosity for a total volume of the first layer;
47-49 vol % abrasive particles for the total volume of the first layer;
28-32 vol % brown fused alumina for a total volume of abrasive particles; and
68-72 vol % black alumina for a total volume of abrasive particles.

18. The cutting wheel of claim 1, wherein the body comprises:
23-25 vol % bond material for a total volume of the first layer;
2-4 vol % cryolite material for a total volume of the first layer;
2-4 vol % CaCO$_3$ for a total volume of the first layer;
21-23 vol % porosity for a total volume of the first layer;
47-49 vol % abrasive particles for the total volume of the first layer;
48-52 vol % brown fused alumina for a total volume of abrasive particles; and
48-52 vol % black alumina for a total volume of abrasive particles.

19. A grinding tool comprising:
a body having a first layer, the first layer including:
a bond material that is at least about 20 vol % of a total volume of the first layer;
a filler;
abrasive particles contained within the bond material, the abrasive particles including a first type of the abrasive particle including black alumina, wherein at least about 10 vol % of a total volume of the abrasive particles includes black alumina; and
wherein the black alumina includes a FeTiO$_3$ phase within a range of about 4 vol % to about 8 vol % of a total volume of the black alumina.

20. The grinding tool of claim 19, wherein the abrasive particles consist essentially of black alumina.

* * * * *